United States Patent
Singh et al.

(10) Patent No.: US 11,512,902 B2
(45) Date of Patent: Nov. 29, 2022

(54) FLOW BAFFLES FOR SHELL AND TUBE HEAT EXCHANGERS

(71) Applicant: HOLTEC INTERNATIONAL, Camden, NJ (US)

(72) Inventors: Krishna P. Singh, Hobe Sound, FL (US); Joseph Rajkumar, Cherry Hill, NJ (US)

(73) Assignee: HOLTEC INTERNATIONAL

( * ) Notice: Subject to any disclaimer, the term of this patent is extended or adjusted under 35 U.S.C. 154(b) by 541 days.

(21) Appl. No.: 16/381,728

(22) Filed: Apr. 11, 2019

(65) Prior Publication Data
US 2019/0234689 A1    Aug. 1, 2019

Related U.S. Application Data

(63) Continuation-in-part of application No. 16/173,313, filed on Oct. 29, 2018, now Pat. No. 11,306,972.
(Continued)

(51) Int. Cl.
*F28D 7/08*     (2006.01)
*F28F 1/04*     (2006.01)
(Continued)

(52) U.S. Cl.
CPC ........... *F28D 7/08* (2013.01); *F16L 9/003* (2013.01); *F22B 19/00* (2013.01); *F22D 1/32* (2013.01);
(Continued)

(58) Field of Classification Search
CPC ........ F28F 9/013; F28F 9/22; F28F 2009/222; F28F 2009/226; F28F 9/24; F28F 1/04;
(Continued)

(56) References Cited

U.S. PATENT DOCUMENTS

| | | | |
|---|---|---|---|
| 1,814,401 | A | 7/1931 | Snow |
| 2,061,980 | A | 11/1936 | Price |

(Continued)

FOREIGN PATENT DOCUMENTS

| | | |
|---|---|---|
| JP | S60243494 | 12/1985 |
| WO | WO 2004/052524 | 6/2004 |

OTHER PUBLICATIONS

International Search Report and Written Opinion for International Application No. PCT/US18/57949 dated Jan. 15, 2019.
(Continued)

*Primary Examiner* — Tho V Duong
*Assistant Examiner* — Raheena R Malik
(74) *Attorney, Agent, or Firm* — The Belles Group, P.C.

(57) ABSTRACT

An axial flow baffle for a shell and tube heat exchanger includes a substantially planar body configured for transverse arrangement in a longitudinally elongated shell of the shell and tube heat exchanger, a plurality of axial flow tube apertures each comprising a central tube hole configured to receive a tube of the heat exchanger, and an array of peripheral primary flow holes circumferentially spaced apart around the tube hole. The primary flow holes each interrupt the central tube hole and formed a radially inward projecting tube support protrusions between the primary flow holes which engage a single tube. Each primary flow hole has a non-polygonal configuration, which may be semicircular in some embodiments. The primary flow holes create axial flow around the periphery of the tubes through the baffles. In another aspect, a hybrid cross-flow baffle includes a combination of axial flow tube apertures and circular tube support holes.

19 Claims, 29 Drawing Sheets

Related U.S. Application Data

(60) Provisional application No. 62/580,125, filed on Nov. 1, 2017, provisional application No. 62/630,573, filed on Feb. 14, 2018, provisional application No. 62/655,858, filed on Apr. 11, 2018.

(51) Int. Cl.

| | |
|---|---|
| *F16L 9/00* | (2006.01) |
| *F28D 7/16* | (2006.01) |
| *F28F 9/22* | (2006.01) |
| *F22D 1/32* | (2006.01) |
| *F28D 21/00* | (2006.01) |
| *F22B 19/00* | (2006.01) |
| *F28F 9/16* | (2006.01) |
| *F28D 7/00* | (2006.01) |
| *F28F 9/02* | (2006.01) |

(52) U.S. Cl.
CPC ......... *F28D 7/0083* (2013.01); *F28D 7/1607* (2013.01); *F28D 7/1638* (2013.01); *F28D 21/0001* (2013.01); *F28F 1/04* (2013.01); *F28F 9/0219* (2013.01); *F28F 9/16* (2013.01); *F28F 9/22* (2013.01); *F28F 2009/226* (2013.01)

(58) Field of Classification Search
CPC .. F28F 9/0219; F28F 9/16; F28D 7/08; F28D 7/0083; F28D 7/1607; F28D 7/1638; F28D 21/0001; F16L 9/003; F22B 19/00; F22D 1/32
USPC ........................................................ 165/163
See application file for complete search history.

(56) References Cited

U.S. PATENT DOCUMENTS

| | | |
|---|---|---|
| 3,118,497 A | 1/1964 | Olson |
| 3,125,161 A | 3/1964 | Romanos |
| 3,333,630 A | 8/1967 | Charcharos |
| 3,566,961 A * | 3/1971 | Lorenz .................... F28F 27/02 165/159 |
| 3,702,633 A | 11/1972 | Csathy |
| 3,797,566 A | 3/1974 | Credoz et al. |
| 3,841,271 A | 10/1974 | Massaro |
| 3,841,272 A * | 10/1974 | Mayer ..................... F22B 1/025 122/32 |
| 3,842,904 A | 10/1974 | Gardenier |
| 4,120,350 A * | 10/1978 | Norton .................... F28F 19/00 165/162 |
| 4,163,570 A | 8/1979 | Johnsen et al. |
| 4,204,305 A * | 5/1980 | Norton .................... B23P 15/26 29/890.043 |
| 4,237,968 A | 12/1980 | Duke |
| 4,276,928 A | 7/1981 | Blaskowski |
| 4,436,146 A * | 3/1984 | Smolarek ................. F28F 9/00 165/111 |
| 4,612,980 A | 9/1986 | Roberts |
| 4,635,707 A | 1/1987 | Gentry |
| 5,296,199 A | 3/1994 | Kwok et al. |
| 5,323,849 A | 6/1994 | Korczynski, Jr. et al. |
| 5,579,836 A | 12/1996 | Maruyama |
| 6,126,082 A * | 10/2000 | Doyle ..................... F28D 7/026 237/12.3 R |
| 6,273,180 B1 | 8/2001 | Joshi et al. |
| 6,810,101 B2 * | 10/2004 | Klarner ................. F28F 9/0131 376/405 |
| 6,914,955 B2 * | 7/2005 | Klarner ................. F22B 37/205 122/32 |
| 8,573,288 B2 * | 11/2013 | Inoue .................... F28F 9/0131 165/162 |
| 8,789,389 B2 | 7/2014 | Ogasawara et al. |
| 9,146,045 B2 | 9/2015 | Miglio |
| 9,534,779 B2 * | 1/2017 | Wepfer .................. F22B 1/025 |
| 9,683,732 B2 * | 6/2017 | Wepfer .................... F28D 7/06 |
| 2007/0079956 A1 | 4/2007 | Howard |
| 2010/0300653 A1 | 12/2010 | Bonner |
| 2012/0199323 A1 | 8/2012 | Pazzaglia et al. |
| 2013/0269910 A1 | 10/2013 | De Piero et al. |
| 2016/0291570 A1 | 10/2016 | Iriguchi et al. |

OTHER PUBLICATIONS

International Search Report and Written Opinion for International Application No. PCT/US2019/026898 dated Aug. 2, 2019.

\* cited by examiner

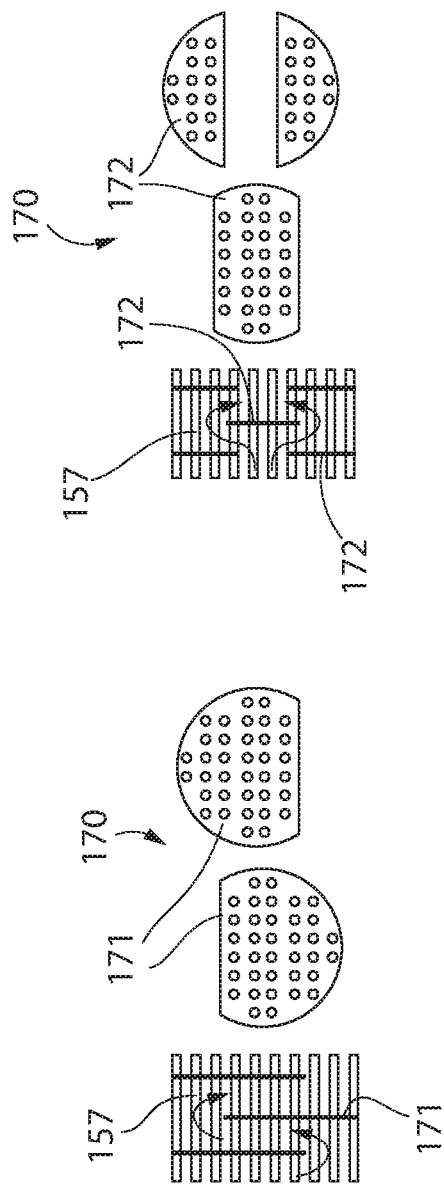
FIG. 6A
FIG. 6B
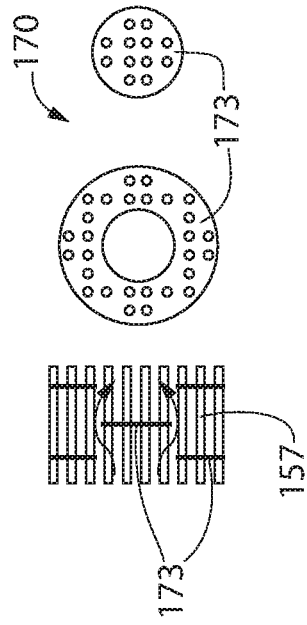
FIG. 6C

FLOW BAFFLES FOR SHELL AND TUBE HEAT EXCHANGERS

CROSS-REFERENCE TO RELATED APPLICATIONS

The present application is a continuation-in-part of U.S. Non-Provisional application Ser. No. 16/173,313 filed Oct. 29, 2018, which claims the benefit of priority to U.S. Provisional Application No. 62/580,125 filed Nov. 1, 2017, and U.S. Provisional Application No. 62/630,573 filed Feb. 14, 2018. The present application further claims the benefit of priority to U.S. Provisional Application No. 62/655,858 filed Apr. 11, 2018. The entireties of all of the foregoing applications are incorporated herein by reference.

BACKGROUND OF THE INVENTION

The present invention generally relates to heat exchangers, and more particularly to shell and tube type heat exchangers suitable for the power generation or other industries.

Shell and tube type heat exchangers are used in the power generation and other industries to heat or cool various process fluids. For example, heat exchangers such as feedwater heaters are employed in Rankine power generation cycles in combination with steam turbine-generator sets to produce electric power. In such applications, the shell-side fluid (i.e. fluid flowing within the shell external to the tubes) is typically steam and the tube-side fluid (i.e. fluid flowing inside the tubes) is feedwater. Lower pressure steam exhausted from the turbine is condensed which forms the feedwater. Multiple feedwater heaters are generally employed in a Rankine cycle to sequentially and gradually increase the temperature feedwater using steam extracted from various extraction points in the steam turbine. The heated feedwater is returned to the steam generator where it is converted back to steam to complete the cycle. The heat source used to convert the feedwater to steam in the steam generator may be nuclear, fossil fuels, solar, biomass, or other sources.

Typical tubular heat exchanger types, shown in the TEMA (Tubular Exchanger Manufacturers Association) standards for example, usually employ either straight tubes or U-tubes. The tubes individually provide the pressure boundary for the tube-side fluid. Tube bundles comprising a multitude of such tubes are commonly enclosed in a straight shell which provides the pressure boundary for the shell-side fluid. The opposite ends of U-tubes in a U-tube bundle are supported by and fluidly sealed to a single tubesheet for support by suitable means to provide a fluid tight seal. The opposite ends of straight tubes in a straight tube bundle are supported by and fluidly sealed to a pair of spaced apart parallel tubesheets provided at opposite ends of the straight shell.

In certain operating conditions, high longitudinal stresses in the shell and the tube bundle arise from differential thermal expansion due to differences in the shell and tubing material's coefficients of thermal expansion and fluid temperatures between the two flow streams (tube-side and shell-side). In fixed tubesheet heat exchangers operating under severe service conditions at high temperatures (e.g. temperatures in excess of 500 degrees F.), the differential expansion induced stress is the greatest threat to the unit's integrity and reliability. Other design alternatives used in the industry, such as a straight shell with an in-line bellow type expansion joint, outside packed floating head, etc., suffer from demerits such as risk of leakage (packed head design) or reduced structural ruggedness (expansion joint design).

A need exists for an improved heat exchanger design which can compensate more effectively for differential thermal expansion and improve reliability.

Cross baffles are also an essential part of shell-and-tube heat exchangers. Examples of the types of cross baffle designs based on TEMA standards include well-known single segmental baffles, double segmental baffles, and triple segmental baffles. The baffles are oriented transversely to the length of the tubes and function to both support the tubes and direct the shell-side fluid flow path. Virtually all baffle types such as those mentioned above direct the shell-side fluid (e.g. steam) in a flow configuration or pattern that is largely across and transverse to the rows of tubes in the shell-side space (i.e. cross flow), resulting in greater turbulent flow which enhances heat transfer rate. This cross flow provides the opportunity to expend greater pumping power to realize a high shell-side film coefficient which maximizes heat transfer rates. In many cases, the design choice for maximizing heat transfer rates at the expense of greater pressure loss is the correct approach. However, there are also cases where minimizing the pumping cost with a concomitant reduction in the heat transfer rate may be the right design objective for a heat fluid flow system requiring minimum pressure loss or drop through the heat exchanger. For such a strategy to work, the shell-side flow must be maintained as longitudinal and linear through the shell-side with respect to the tubes' longitudinal axis as possible.

A need further exists for improvements in flow baffles for heat exchangers.

SUMMARY OF THE INVENTION

A shell and tube heat exchanger for feedwater heating and other process fluid heating applications according to the present disclosure provides uniquely configured axial flow tube support baffles (axial flow baffles for brevity) which maintain uni-directional longitudinal flow of the shell-side fluid through the shell-side space of the heat exchanger. This minimizes shell-side pressure loss of the shell-side fluid and pumping costs. Additional tube surface area may instead be provided to achieve the desired heat transfer rate in lieu of cross flow. A related method for fabricating the axial flow baffle is provided which is a mechanically simple and low cost process for forming an axial flow baffle.

The axial flow baffles comprise metal plates having a body including an array of tube apertures each comprising a central round or circular tube hole which receives a single tube therethrough and a plurality of primary flow holes spaced circumferentially around the circumference of the tube hole. The primary flow holes penetrate the circular peripheral edge and overlap with the tube holes such that a longitudinal flow area is provided by them which is in intimate relationship with the annulus formed by the tube hole. The size and flow area of the primary flow holes may be selected to achieve the desired the axial flow area requirement. In some embodiments, additional secondary and tertiary flow holes may be formed in the solid ligaments remaining between the tube apertures. These additional flow holes do not overlap the tube holes and provide additional flow area for heat exchanger internal shell-side flow to pass through the baffles to alleviate shell-side fluid pressure loss, but are otherwise inconsequential to the heat exchanger's performance and heat transfer rate.

Each tube aperture includes a plurality of radially inwardly projecting tube support protrusions which each engage and hole the tubes in position in the tube hole. The support protrusions help minimize or avoid flow induced vibration and fretting of the tubes where they pass through the baffles.

The present axial flow baffles may be oriented transversely and perpendicularly to the length of the tubes, which are arranged together in one or more tube bundles. In one embodiment, every tube in the shell-side compartment or space of the heat exchanger advantageously passes through and is supported by full shell-side diameter axial flow baffles. In other words, there are no intentional large open "windows" or areas in the shell-side space around the baffles for the flow to significantly bypass the baffles in a cross-flow pattern similar to what occurs with the "segmental" class of baffles mentioned above used to promote cross flow. Accordingly, in one configuration the present axial flow baffles have a diameter substantially commensurate with the inside diameter of the shell, albeit fractionally smaller to slide and fit inside the shell with the tube bundle(s) when the heat exchanger is assembled. The outer peripheral circumferentially-extending edge of the baffle closely conforms and is positioned proximate to the inside surface of the shell. The axial flow baffles may therefore be circular in shape in one embodiment.

Full support of the tubes at every baffle location advantageously eliminates non-uniform tube support in the shell-side space of the heat exchanger. This advantageously eliminates long unsupported lengths of tubing which are prone to turbulent flow induced vibration, which can cause excessive movement and tube fretting wear at the tube support hole locations in the baffles. This situation can lead to excessive fretting wear of the tube material at the tube hole (i.e. gradual necking down of the tube wall), resulting in premature failure of the tubes and tube-side fluid leaks, thereby requiring the leaking tubes to be plugged at the expense of a reduction in the heat exchangers design heat transfer rate.

The present invention also provides a full-diameter hybrid tube support flow baffle for heat exchanger designs where turbulent shell-side fluid cross-flow is desirable to maximize heat transfer rates with concomitant increase in shell-side pressure loss and higher pumping costs. Such instances may occur where there is limited available space within the confines of the power generation or other type industrial facility (e.g. chemical processing plant). This hybrid cross-flow baffle design replicates and creates the various shell-side fluid cross-flow flow patterns achieved by the foregoing different segmental baffles. However, unlike conventional segmental baffles which comprises less than full diameter baffle "segments" cut from a solid circular plate which support only those tubes passing through the segments at each baffle location and not those in the empty bypass paths around the baffles, the present hybrid baffle fully supports every tube at each baffle location. The hybrid baffles may include various configurations with at least one portion including the present axial flow tube apertures with primary flow holes and remaining portions of the baffle includes conventional circular tube holes alone.

According to one aspect, an axial flow baffle plate for a shell and tube heat exchanger includes: a planar body configured for transverse arrangement in a longitudinally elongated shell of the shell and tube heat exchanger; a plurality of axial flow tube apertures each comprising a central tube hole configured to receive a tube of the heat exchanger, and an array of peripheral primary flow holes circumferentially spaced apart around the tube hole; the primary flow holes each interrupting the tube hole and forming a plurality of radially inward projecting tube support protrusions between the primary flow holes, each tube support protrusion being configured to engage the tube when located in the tube hole; wherein each primary flow hole has a non-polygonal configuration.

According to another aspect, a heat exchanger with axial shell-side flow includes: a longitudinally-extending shell defining a longitudinal axis and a shell-side space; a plurality of longitudinally-extending tubes arranged in the shell-side space; a plurality of transversely oriented baffles supporting the tubes in the shell; each baffle including a plurality of axial flow tube apertures each comprising a tube hole engaging and supporting one of the tubes, and a plurality of primary flow holes arranged circumferentially around and partially intersecting the tube hole; each primary flow hole configured to form a crescent-shaped flow area around the one of the tubes; wherein a shell side fluid flows through the primary flow holes in a parallel direction to the longitudinal axis.

According to another aspect, a method for forming an axial flow baffle for a shell and tube heat exchanger includes: providing a baffle workpiece; locating a centerpoint of a first axial flow tube aperture; drilling a plurality of primary flow holes along a first reference circle arranged concentrically around the centerpoint of the first flow aperture; and drilling a central tube hole at the centerpoint after drilling the primary flow holes such that the tube hole partially overlaps with each of the primary flow holes.

According to another aspect, a segmental flow baffle for a shell and tube heat exchanger includes: a planar body configured for transverse arrangement in a longitudinally elongated shell of the shell and tube heat exchanger; a first region comprising a plurality of first tube apertures having a first configuration; a second region comprising a plurality of second tube apertures having a second configuration different than the first configuration; wherein each of the first and second tube apertures are configured to support a single tube of the heat exchanger.

A shell and tube heat exchangers suitable for feedwater heating and other process fluid heating applications according to the present disclosure can also compensate for differential thermal in a manner which overcomes the foregoing differential thermal expansion problems with past fixed heat exchanger designs. A curved tube bundle heat exchanger design is provided which, for certain operating conditions, may be substantially superior with respect to reliability and thermal efficiency. The curved tube bundle may have generally J-shaped tubes configured as disclosed herein. The J-curved tube bundle serves to substantially eliminate the high longitudinal stresses in the shell and the tube bundle that arise from differential thermal expansion from the differences in the shell and tubing material's coefficients of thermal expansion and fluid temperatures between the two tube-side and shell-side flow streams. In fixed tubesheet heat exchangers operating at high temperatures, the differential expansion induced stress and cracking is the greatest threat to the unit's integrity.

Another operational benefit of the present heat exchanger design is the introduction of the shell side inlet flow into an open (un-tubed) space or plenum, which removes or minimizes the risk of impingement erosion damage common to tubular heat exchangers that have the shell inlet located in close proximity of the tubes. The present design prevents the shell-side flow from impinging directly on the tubes in a concentrated fluid stream (i.e., the flow is not delivered in the congested tubed space and orthogonal to the tubes' axis) by providing room within the shell for the shell-side flow to expand thereby resulting in a reduction in velocity and less erosive effects. This is significant because the shell-side fluid inlet nozzle is typically smaller in diameter than the shell itself.

In one configuration, the heat exchanger includes an integrated shell assembly comprising a longitudinal shell and a transverse shell arranged orthogonally (perpendicularly) or obliquely to the longitudinal shell. The longitudinal shell may be coupled between and inboard of opposing ends of the transverse shell, and may be approximately centered therebetween in some embodiments. The shells may sealably joined and fluidly coupled directly together into a basic T-shaped heat exchanger unit. A variety of other geometrically shaped heat exchanger units or assemblies may be formed by combining and fluidly interconnecting several basic T-shaped heat exchanger units to form a shared common shell-side pressure retention boundary. The J-shaped tube bundle can be readily accommodated in the foregoing shell geometries. The shells may be seal welded together in one construction. The shell-side spaces within each shell of the assembly are in fluid communication forming a contiguous shell-side space through which the tubes of the tube bundle are routed. It bears noting the present assembly of shells collectively form a single heat exchanger unit since each shell is not in itself a discrete or separate heat exchanger with its own dedicated tube bundle. The heat exchanger thus comprises a single tube-side inlet tubesheet and single tube-side outlet tubesheet located within different shells of the T-shaped shell configuration, as further described herein. In one embodiment, the tubesheets are oriented perpendicular to each other.

In one respect, a heat exchanger comprises: an elongated longitudinal shell defining a first shell-side space and a longitudinal axis; an elongated transverse shell defining a second shell-side space and a transverse axis; the transverse shell oriented transversely to the longitudinal shell; the second transverse shell fluidly coupled to a first end of the longitudinal shell such that the second shell-side space is in fluid communication with the first shell-side space; a tube bundle extending through the first and second shell-side spaces, the tube bundle comprising a plurality of tubes each having a first end coupled to a first tubesheet in the first shell-side space of the first longitudinal shell and a second end coupled to a second tubesheet in the second shell-side space of the second transverse shell; wherein the first and second tubesheets are oriented non-parallel to each other. In one embodiment, the longitudinal shell is coupled to the transverse shell inwards of and between opposing ends of the transverse shell. In the same or another embodiment, the longitudinal shell is oriented perpendicularly to the transverse shell forming a T-shaped heat exchanger.

In another respect, a heat exchanger comprises: an inlet tubesheet and an outlet tubesheet; an elongated longitudinal shell assembly defining a first shell-side space and a longitudinal axis; the longitudinal shell assembly comprising opposing first and second ends, a circumferential sidewall extending between the first and second ends, a tube-side fluid inlet nozzle fluidly coupled to the inlet tubesheet, and a shell-side fluid outlet nozzle fluidly coupled to the circumference sidewall; an elongated transverse shell assembly fluidly coupled to the first end of the longitudinal shell, the transverse shell assembly defining a second shell-side space and a transverse axis oriented perpendicularly to the longitudinal axis of the longitudinal shell, the second shell-side space being in direct fluid communication with the first shell-side space; the transverse shell assembly comprising opposing first and second ends, a circumferential sidewall extending between the first and second ends, a tube-side fluid outlet nozzle fluidly coupled to the outlet tubesheet, and a shell-side fluid inlet nozzle; a J-shaped tube bundle extending through the first and second shell-side spaces between the inlet and outlet tubesheets, the tube bundle comprising a plurality of tubes each having a first end fluidly coupled to the inlet tubesheet in the first shell-side space of the longitudinal shell and a second end fluidly coupled to the outlet tubesheet in the second shell-side space of the transverse shell; a tube-side fluid flowing through the tube bundle and a shell-side fluid flowing through the longitudinal and transverse shell assemblies; wherein the first and second tube-sheets are oriented non-parallel to each other.

In another respect, a heat exchanger comprises: a longitudinally-extending first shell defining a first shell-side space and a first longitudinal axis; a longitudinally-extending second shell defining a second shell-side space and a second longitudinal axis, the second shell arranged parallel to the first shell; a transverse third shell fluidly coupling the first and second shells together, the third shell extending laterally between the first and second shells and defining a third shell-side space in fluid communication with the first and second shell-side spaces; first and second J-shaped tube bundles each comprising a plurality of tubes and each tube defining a tube-side space, the first tube bundle extending through the first and third shells, and the second tube bundle extending through the second and third shells; a first tube-side inlet nozzle disposed on the first shell; a second tube-side inlet nozzle disposed on to the second shell; and at least one shell-side inlet nozzle disposed on the transverse third shell; wherein a shell-side fluid flows in path from the third shell-side space through the first and second shell-side spaces to a shell-side outlet nozzle disposed on each of the first and second shells.

Any of the features or aspects of the invention disclosed herein may be used in various combinations with any of the other features or aspects. Accordingly, the invention is not limited to the combination of features or aspects disclosed herein as examples.

Further areas of applicability of the present invention will become apparent from the detailed description hereafter and drawings.

BRIEF DESCRIPTION OF THE DRAWINGS

The features of the exemplary embodiments will be described with reference to the following drawings where like elements are labeled similarly, and in which:

FIG. 6A shows a first embodiment of shell-side flow baffles;

FIG. 6B shows a second embodiment of shell-side flow baffles;

FIG. 6C shows a third embodiment of shell-side flow baffles;

Figure 1:
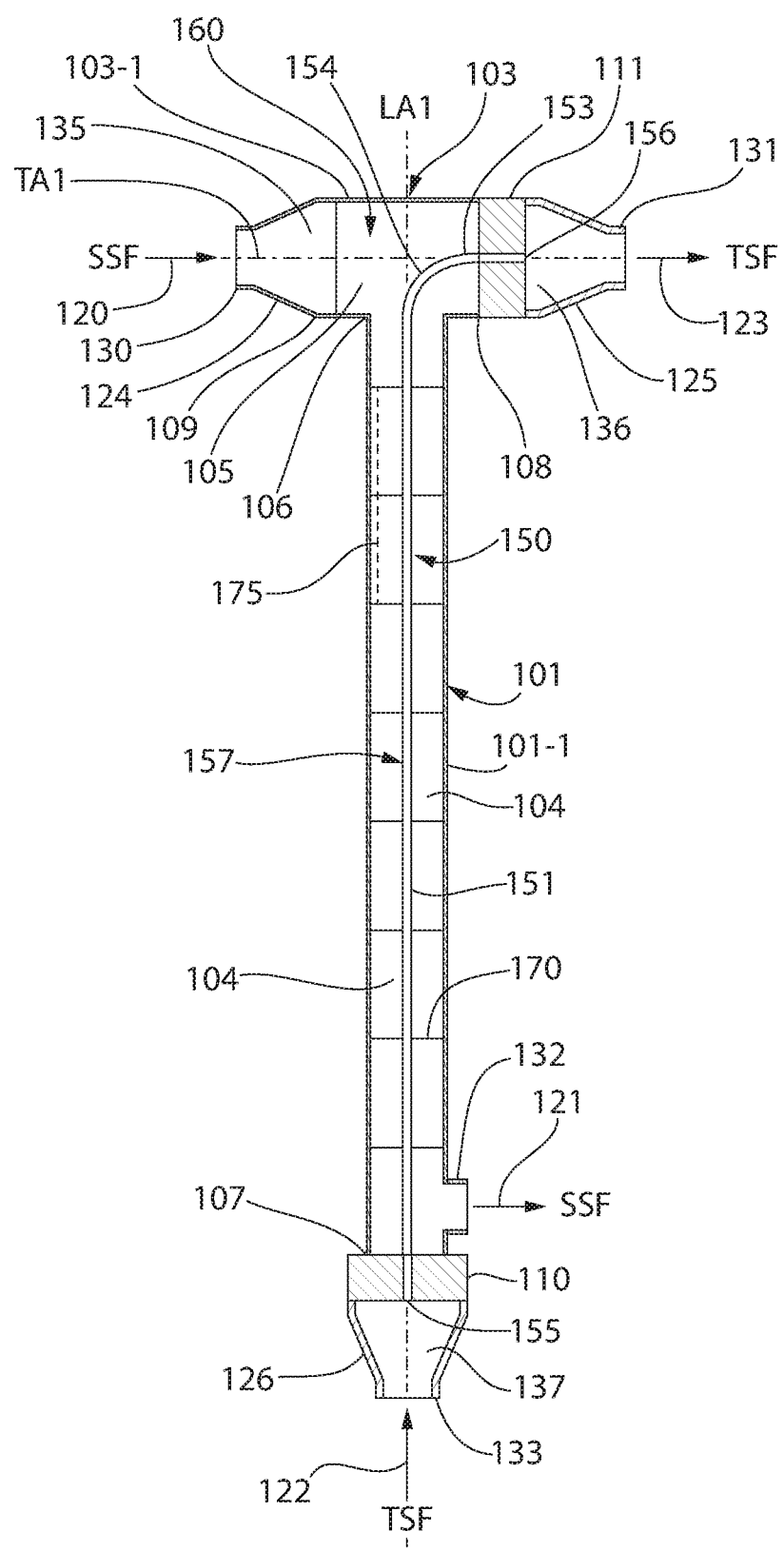
FIG. 1 is a cross-sectional view of a curved tube heat exchanger according to the present disclosure including a longitudinal shell and a transverse shell.

All drawings are schematic and not necessarily to scale. Parts shown and/or given a reference numerical designation in one figure may be considered to be the same parts where they appear in other figures without a numerical designation for brevity unless specifically labeled with a different part number and described herein.

DETAILED DESCRIPTION OF THE INVENTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Figure 2:
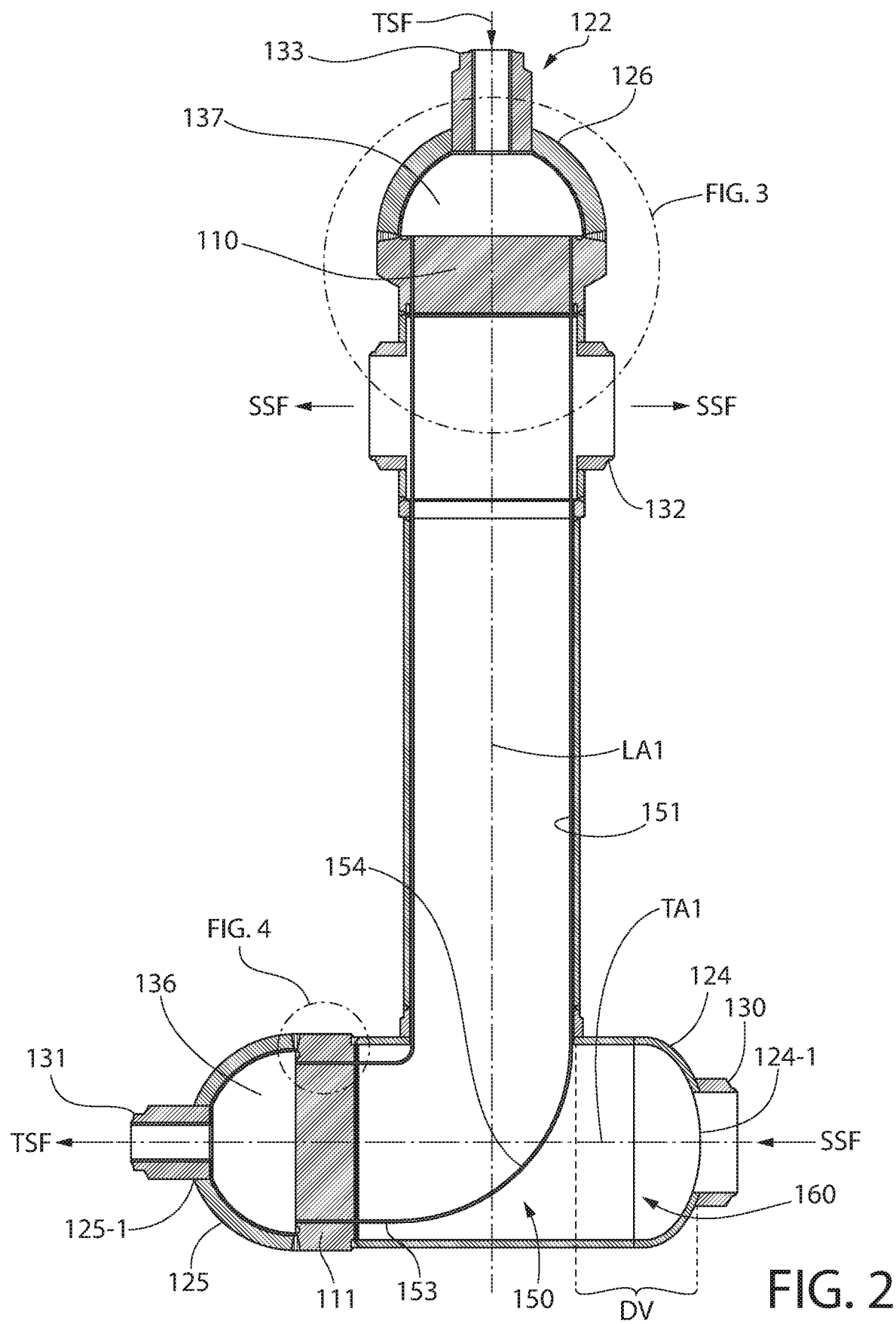
FIG. 2 is a cross-sectional view of the curved tube heat exchanger showing an alternative orientation.
Figure 3:
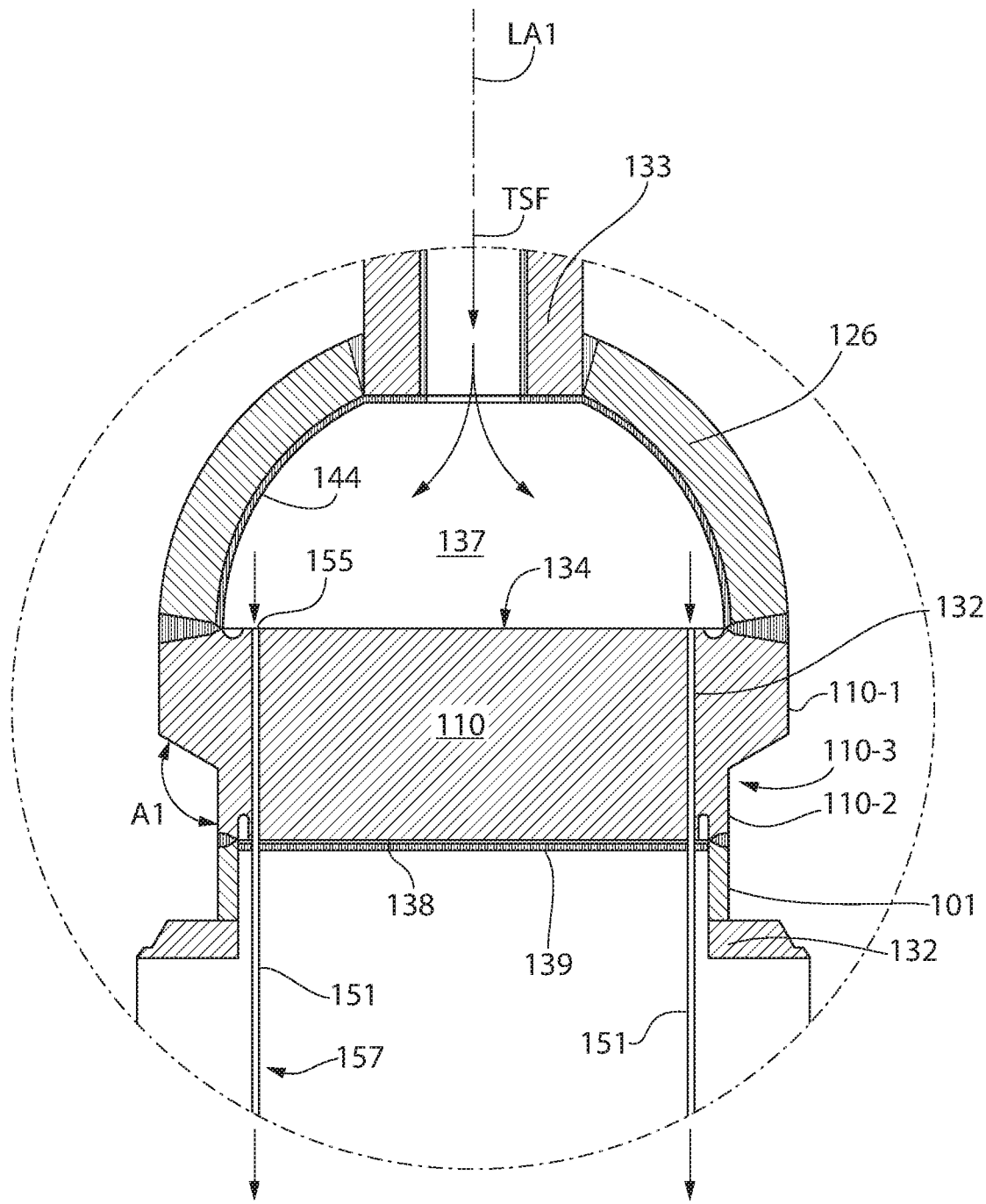
FIG. 3 is an enlarged detail from FIG. 2 showing the tube-side inlet head and tubesheet construction.
Figure 4:
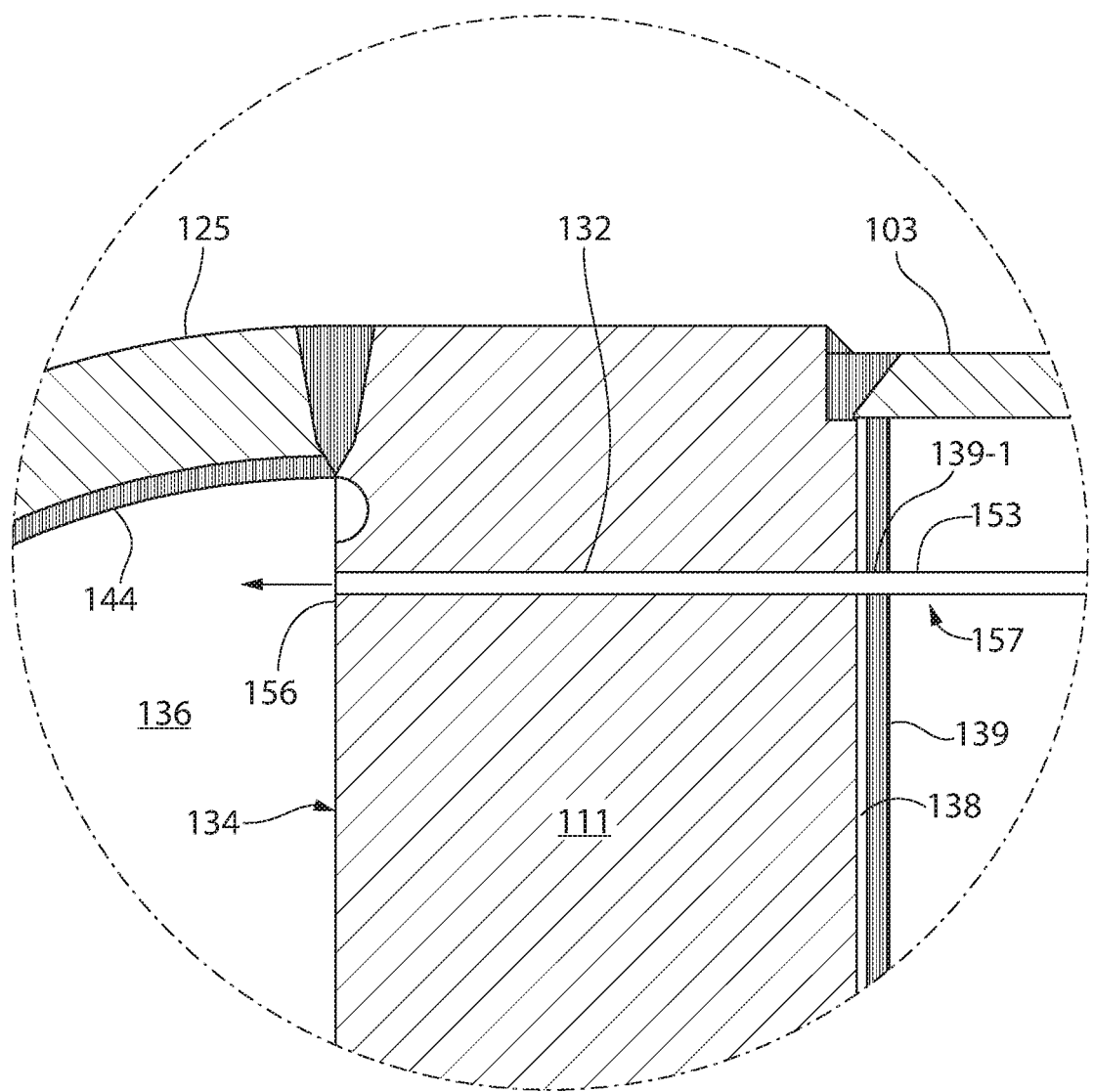
FIG. 4 is an enlarged detail from FIG. 2 showing a portion of tube-side outlet tubesheet construction.

FIGS. 1 and 2 depict one non-limiting embodiment of a shell and tube heat exchanger 100 according to the present disclosure. FIGS. 3 and 4 depict construction details of the heat exchanger. Heat exchanger 100 may be an ASME Boiler & Pressure Vessel Code (B&PVC) compliant construction.

Heat exchanger 100 includes an integrally formed shell assembly comprising an elongated longitudinal shell 101 defining a longitudinal axis LA1 and an elongated transverse shell 103 defining a transverse axis TA1. Longitudinal and transverse shells 101 and 103 are cylindrical in one embodiment each including axially straight and circumferentially-extending sidewalls 101-1 and 103-1 respectively. Longitudinal shell 101 includes terminal opposing ends 106, 107. Transverse shell 103 includes terminal first and second ends 108, 109. The longitudinal and transverse shells may have the same or different diameters. The longitudinal shell and transverse shell define respective internal open shell-side spaces 104 and 105 for receiving, circulating, and discharging a shell-side fluid SSF. The shell-side spaces 104 and 105 are in fluid communication such that each shell-side space fully opens into the adjoining shell-side space to form a singular and contiguous common shell-side space for housing a tube bundle.

It bears noting that although the longitudinal and transverse shells 101 and 103 are depicted as vertically and horizontally oriented respectively for convenience of reference only, the heat exchanger 100 may be used in any suitable orientation since both the tube-side and shell-side fluids are generally pressurized. Furthermore, it is apparent by comparing FIGS. 1 and 2 that the transverse shell 103 may be arranged at the top or bottom of the shell assembly, or on either side in other embodiment in which the longitudinal shell 101 may be horizontally oriented and the transverse shell vertically oriented instead. Any orientation or location of either shells 101, 103 may be used to suit the particular installation needs and available site space for the heat exchanger particularly in heat exchanger retrofit applications.

Each of the longitudinal and transverse shell 101, 103 is linearly elongated and straight having a substantially greater length than diameter. Longitudinal shell 101 may be longer than transverse shell 103 in length. In some embodiments, longitudinal shell 101 may have a length greater than two times or more the length of the transverse shell 103 (see, e.g. FIG. 1).

In the present configuration, the longitudinal and transverse shells 101, 103 are collectively arranged to form an integrated T-shaped shell assembly. Terminal end 106 of longitudinal shell 101 is fluidly and sealably joined or coupled directly to the transverse shell 103 between ends 108, 109 of the transverse shell without any intermediary piping or structures. In one implementation, the longitudinal shell is coupled to transverse shell 103 approximately midway between its ends 108, 109 as shown. In other possible embodiments, the longitudinal shell 101 may be offset from the midpoint of the transverse shell 103. The opposite second terminal end 107 of the longitudinal shell 101 is sealably joined directly to a first inlet tubesheet 110 (see, e.g. FIG. 3), which is oriented transversely across the end and to the longitudinal axis LA1. Longitudinal shell 101 may be seal welded via circumferential welds to both the transverse shell 103 and first tubesheet 110 in one construction to form a sealed leak-proof fluid connection and pressure retention boundary.

The shell-side fluid outlet 121 and a tube-side fluid TSF inlet 122 may be disposed on longitudinal shell 101. The shell-side fluid outlet 121 may comprise one or more outlet nozzles 132 which may be welded to or formed integrally with the longitudinal shell as a unitary structural part thereof. In one embodiment, the outlet nozzle(s) is/are radially oriented and located proximate to the first tubesheet 110 as shown to maximize the distance and heat between the shell-side fluid inlet and outlet of the heat exchanger 100 for optimizing heat transfer to the tube-side fluid.

The tube-side fluid inlet 122 may comprise a welded assembly including tube-side inlet channel or head 126 seal welded to tubesheet 110, and a tube-side fluid inlet nozzle 133 seal welded to the head as shown. The cavity within head 126 defines a tube-side inlet plenum 137.

The shell-side fluid inlet 120 and a tube-side fluid TSF outlet 123 may be disposed on transverse shell 103. The shell-side fluid inlet 120 may comprise a welded assembly including shell-side inlet channel or head 124 seal welded to second end 109 of transverse shell 103, and a shell-side inlet nozzle 130 seal welded to the head as shown. Head 124 defines a shell-side inlet plenum 135.

The second terminal end 108 of the transverse shell 103 is sealably joined or coupled directly to a second outlet tubesheet 111 oriented transversely across the end and to the transverse axis TA1 of the shell. The tube-side fluid outlet 123 may comprise a welded assembly including tube-side outlet channel or head 125 seal welded to tubesheet 111, and a tube-side fluid outlet nozzle 131 seal welded to the head as shown. Head 125 defines a tube-side outlet plenum 136.

The first tubesheet 110 in longitudinal shell 101 and second tubesheet 111 in transverse shell 103 may be oriented perpendicularly to each other as shown. In other configurations where the transverse shell may be oriented obliquely to the longitudinal shell, the tubesheets 110, 111 may be oriented at an oblique angle to each other.

In one embodiment, the tube-side fluid nozzles 131, 133, and shell-side fluid nozzle 130 preferably may be centered on their respective heads 125, 126, and 124. The nozzles 131 and 130 are thus coaxial with the transverse axis TA1 of the transverse shell 103. Nozzle 133 preferably may be coaxial with the longitudinal axis LA1 of longitudinal shell 101. The coaxial introduction or extraction of flow to/from the heat exchanger 100 contributes to less turbulent flow regimes within the heat exchanger. In other possible embodiments, however, the nozzles 130, 131, and 133 may be non-coaxially oriented with their respective axes such as obliquely angled or perpendicularly/radially oriented to their respective axes. These later arrangements may be necessary depending on available space within the power generation or other industrial facility and existing/new piping runs to/from the heat exchanger.

Any suitable type and shape of heat exchanger channel or head used in the art may be used for heads 124-126. The heads may be ASME Boiler & Pressure Vessel Code (B&PVC) compliant heads. Examples of commonly used heat exchanger head types include without limitation a bonnet (dished or frustoconical as shown), straight, hemispherical ("hemi heads"), semi-elliptical, or flanged and dished heads as some non-limiting examples. The type/shape of the heads do not limit the invention in any way. In some embodiments, the heads 125 and 126 may be bolted via flanges to their respective tubesheets 111, 110 where frequent access to inspect and non-destructively examine the tubesheets is required. In some embodiments, a removable cover plate may be used with a straight channel/head welded to the tubesheet instead to facilitate inspection. Accordingly, numerous variations in design are possible to suit particular needs and installation circumstances.

Heat exchanger 100 can advantageously be mounted in any suitable orientation in an available three-dimensional space in the power generation or other industrial facility to best accord with the plant's architectural and mechanical needs (piping runs, support foundation locations, vent & drain lines, etc.). Accordingly, the heat exchanger shown in FIGS. 1 and 2 may be mounted vertically, horizontally, or at any angle therebetween. Although the shell-side outlet nozzle(s) are illustrated as coplanar with the transverse shell 103, in other embodiments the outlet nozzles can be rotated and positioned at any other angled position obliquely to the transverse axis TA1 of the transverse shell to accommodate piping runs to and from the heat exchanger without loss in performance efficacy and efficiency.

The shells 101, 103 of heat exchanger 100 may be formed of any suitable metal used in the art for heat exchanger shells. In one example, the shells may be formed of steel such as stainless steel for corrosion protection. Other suitable metal including various steel or other alloys may of course be used depending on the service conditions encountered (e.g. type of fluid, pressure, and temperature), which may in part dictate the choice of material along with cost. The heads and tubesheets may be made of similar materials or different materials.

The direction of flow of the shell-side and tube-side fluids within the heat exchanger may be countercurrent or co-current. In FIGS. 1 and 2, the tube-side and shell-side fluid flows are in a countercurrent arrangement (i.e. flowing in opposite directions) thereby providing thermally efficient countercurrent flow arrangement with protection of the tube bundle from potentially deleterious effects of impingement from the incoming shellside flow via auxiliary plenum 160 previously described herein. However, if tube damage from shell flow impingement is not a concern, then it may be possible to switch shell-side fluid and tube-side fluid inlets and outlets on both shell and tube sides preserving countercurrency. In some rather infrequent cases, it is desired to have a co-current flow arrangement which can be readily realized by switching either the shellside or the tubeside inlet/outlet nozzles as required. Accordingly, the present heat exchanger is not limited to either countercurrent or co-current flow arrangements.

Although heat exchanger 100 has been discussed and illustrated by a single tube-side tube-pass configuration, in certain applications multiple tubeside pass (multi-pass) arrangements may be employed without difficulty in manners well known in the art. Extension of this design to multi-tube pass can be readily carried out by providing multi-pass bonnets or heads in a similar manner to what is done in straight tube heat exchangers. Thus, for example, for a two-tube pass arrangement, the inlet bonnet or head 126 on the longitudinal shell 101 would be divided into two separate internal chambers, and both inlet and outlet tube-side nozzle connections will be located within the inlet head 126 while the head 125 on the transverse shell 103 serves merely as the return header. For example, heat exchanger head 125 (previously associated with tube-side outlet 123) may be replaced by a fully closed head (i.e. no tube-side fluid outlet nozzle 131). A pass partition plate (not shown) may be mounted within the inlet tube-side flow plenum 137 of inlet head 126 to divide the plenum evenly into an inlet side and an outlet side of the flow plenum. The single inlet nozzle 133 may be replaced by a new tube-side fluid inlet nozzle communicating with the inlet side of the plenum 137 and adding a new separate tube-side fluid outlet nozzle communicating with the outlet side of the plenum. Such nozzles may be radially oriented (i.e. transversely to longitudinal axis LA1) if a straight head design is used, or obliquely to longitudinal axis LA1 if a curved or hemispherical head design is used. These nozzle and partition plate arrangements are well known in the art and commonly used without undue elaboration herein. Accordingly, the T-shaped heat exchanger 100 may be reconfigured in a multitude of ways to fit the particular needs of virtually any application.

In one embodiment, the shell-side fluid may be steam and the tube-side fluid may be feedwater of a Rankine cycle used in a power plant for producing electricity. Other states of fluids and/or types of fluids such as petroleum or chemicals may be processed using heat exchanger 100. For example, both the shell-side and tube-side fluids may be liquid in some applications. Heat exchanger 100 is therefore not limited in the breadth of its applicability and use in an industrial process for heating fluids.

The longitudinal and transverse shells 101, 103 may be thought of as forming shell assemblies when fully constructed and assembled together including the heads, tubesheets, and nozzles. For example, a longitudinal shell 101 assembly comprises the opposing ends 106 and 107, circumferential sidewall 101-1 extending between the ends, tube-side fluid inlet nozzle 133 fluidly coupled to the inlet tubesheet 110, and a shell-side fluid outlet nozzle 132 fluidly coupled to the circumferential sidewall. The transverse shell 103 assembly comprises opposing ends 108 and 109, a circumferential sidewall 103-1 extending between the ends, tube-side fluid outlet nozzle 131 fluidly coupled to the outlet tubesheet 111, and a shell-side fluid inlet nozzle 130.

Figure 5:
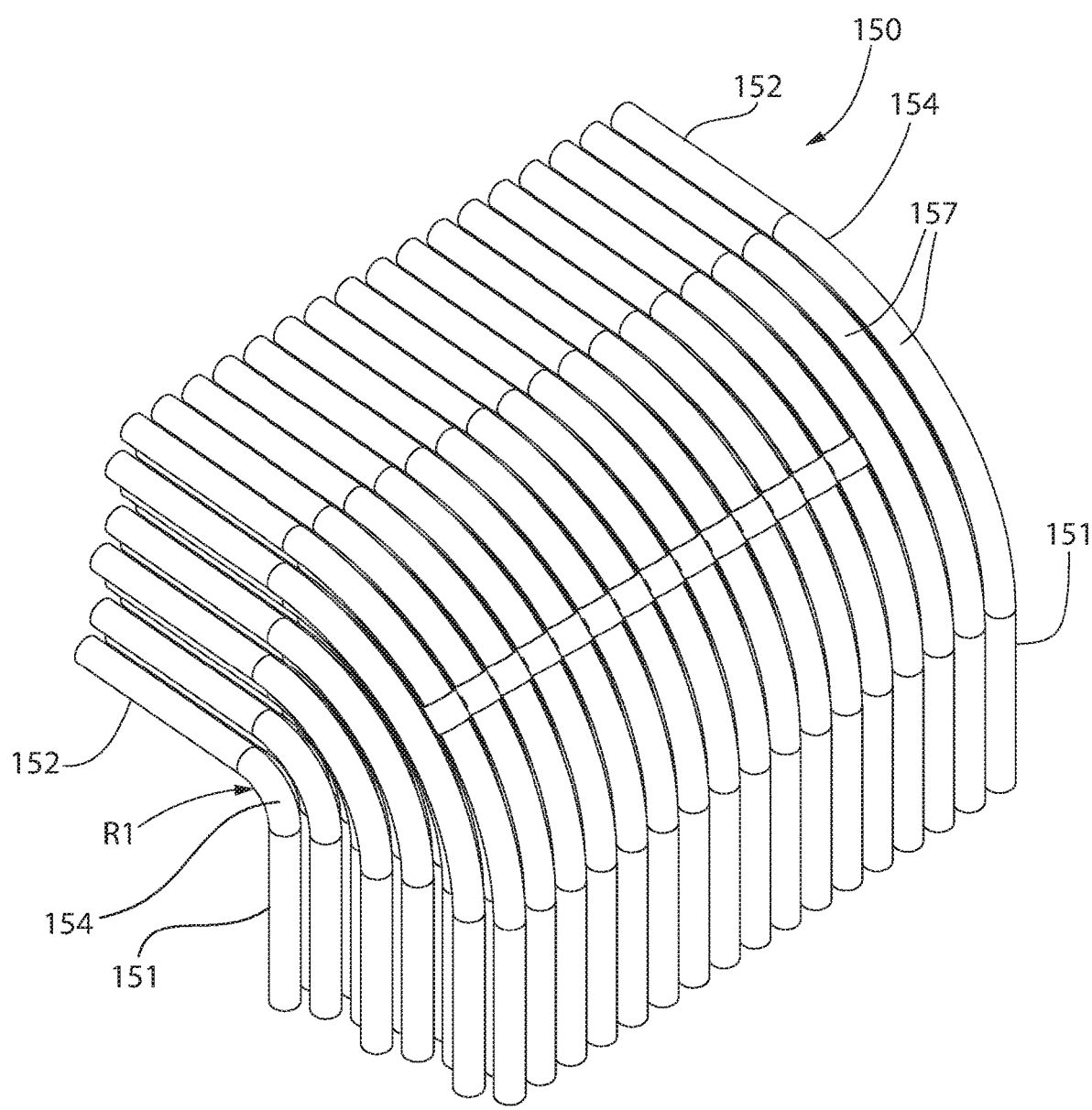
FIG. 5 is a perspective view of the tube bend portion of the J-shaped tube bundle of FIGS. 1 and 2.

With additional reference to FIG. 5 showing the bend area of the tubes, a generally "J-shaped" tube bundle 150 is disposed in the longitudinal and transverse shells 101, 103. The tube bundle 150 comprises a plurality of relatively closely spaced J-shaped tubes 157 which extend contiguously from tube-side inlet tubesheet 110 of longitudinal shell 101 through the shell-side spaces 104 and 105 to tube-side outlet tubesheet 111 of transverse shell 103. FIGS. 1 and 2 depict only a single or a few tubes 157 for brevity, recognizing that the tube bundle 150 comprises multiple tubes of similar shape arranged in parallel to each other to form a tightly packed tube bundle. Tubes 157 are cylindrical with a circular or round cross section. Tubes 157 each include a long leg 151 disposed in longitudinal shell 101 and a short leg 153 disposed in transverse shell 103. The long and short legs 151, 153 are fluidly coupled together by 90-degree arcuately curved and radiused tube bends 154 such that the short leg 153 is perpendicular to the long leg 151. The tube bends 154 may have a minimum centerline bend radius R1 equal to or greater than 2.5 times the tube diameter as an example. Other suitable radiuses may be used. It bears noting that tube legs 151, 153 and bends 154 form a continuous and contiguous tube structure and tube-side space from the inlet of the tubes 157 fluidly coupled to tubesheet 110 to the outlet of the tubes fluidly coupled to outlet tubesheet 111.

Tubes 157 each include a first inlet end 155 defined by long leg 151 which extends through tubesheet 110 to inlet plenum 137 and a second outlet end 156 defined by short leg 153 which extends through tubesheet 111 to plenum 136 (see also FIGS. 1-4). Tubesheets 110, 111 each include a plurality of axially extending and parallel through bores 132 oriented parallel to longitudinal axis LA1 of longitudinal shell 101. Terminal end portions of tubes 157 are received in and extend completely through and inside through bores 132 to the outboard surface or face 134 of each tubesheet 110, 111 (an example of one face 134 of tubesheet 110 being shown in FIG. 3—the other tubesheet 111 having the same arrangement). The open ends 155 of tubes 157 in tubesheet 110 receive the tube-side fluid from inlet nozzle 133 and plenum 137. Conversely, the other open ends 156 of tubes 157 in tubesheet 111 discharge the tube-side fluid into plenum 136 and through outlet nozzle 131. The tubesheets 110, 111 support the terminal end portions of the tubes in a rigid manner.

The tubes 157 are fixedly coupled to tubesheets 110, 111 in a permanently sealed leak-proof manner to prevent leakage from the generally higher pressure tube-side fluid TSF to the lower pressure shell-side fluid SSF. The pressure differential between shell side and tube side may be extremely great for some high pressure heaters creating higher exposure for tube-to-tubesheet joint leaks. For example, tube-side design pressures can range from about 300 psig to over 5000 psig for high pressure feedwater heaters, while the shell-side design pressures can range from about 50 psig to 1500 psig for higher pressure heaters. In some embodiments, the tubes 157 may rigidly coupled to the tubesheets 130, 131 via expansion or expansion and welding; these techniques being well known in the art without further elaboration required. Commonly employed tube expansion processes that may be used include explosive, roller, and hydraulic expansion.

The tubes 157 may be formed of a suitable high-strength metal selected for considerations such as for example the service temperature and pressure, tube-side and shell-side fluids, heat transfer requirements, heat exchanger size considerations, etc. In some non-limiting examples, the tubes may be formed of stainless steel, Inconel, nickel alloy, or other metals typically used for power generation heat exchangers which generally excludes copper which lacks the mechanical strength for such applications.

Advantageously, the J-shaped curved tubes 157 of tube bundle 150 serve to substantially eliminate the high longitudinal stresses in the shell and the tube bundle that arise from differential thermal expansion from the differences in the shell & tubing material's coefficients of thermal expansion and fluid temperatures between the two flow streams (tube-side and shell-side). In fixed tubesheet heat exchangers operating at high temperatures, the differential expansion induced stress is the greatest threat to the unit's integrity.

Another operational benefit is the introduction of the shell side inlet flow into an open (un-tubed) space within the shell which removes or mitigates the risk of impingement damage common to tubular heat exchangers that have the shell inlet located in close proximity to the tubes. This present design prevents the shellside flow from impinging directly on the tubes (i.e., the flow is not delivered in the congested tubed space within the shell thus precluding or minimizing impingement or erosion damage to the tubes).

The inlet and outlet tubesheets 110, 111 have a circular disk-like structure and an axial thickness suitable to withstand cyclical thermal stresses and provide proper support for the tubes 157. The tubesheets may each have a thickness substantially greater than the thickness of their respective shells 101, 130 (e.g. 5 times or greater) as illustrated in the figures. Tubesheets 110, 111 each include a outboard surface or face 134 and inboard surface or face 138. The tubesheets 110, 111 may be formed of a suitable metal, such as steel including alloys thereof. The tubesheets may be formed of stainless steel in one embodiment.

The outer rim of tubesheets 110, 111 is preferably made as thin (radially) as possible within the limitations of the machining equipment so that the differential thermal expansion in the radial direction due to the temperature difference between the perforated region of the tubesheets containing through bores 132 and the solid outer peripheral rim does not produce high interface stresses. The outer peripheral rim may be machined, as practicable, to reduce the rim thickness. Typically, the rim can be made as little as ¼-inch thick in some instances (measured from the outermost tube bore).

Referring to FIGS. 1-4, the tube-side flow path originates with tube-side inlet nozzle 133 fluidly coupled to inlet tubesheet 110 via inlet plenum 137 for introducing the tube-side fluid TSF into the portion of the tube bundle 150 disposed in longitudinal shell 101 (also associated with the outlet of the shell-side fluid from heat exchanger 100). The tube-side fluid enters inlet plenum 137 from inlet nozzle 133 and flows into the tubes 157 in tubesheet 110 and through the tube bundle 150 to outlet tubesheet 111 disposed on transverse shell 103 (also including the inlet 120 of the shell-side fluid into the heat exchanger 100). Tube-side outlet nozzle 131 is fluidly coupled to outlet tubesheet 111 via outlet plenum 136 for discharging the tube-side fluid from the heat exchanger. It bears noting that with the J-shaped tube bundle 150, the tube-side fluid is discharged from heat exchanger 100 in a direction which is 90 degrees to the inlet of the tube-side fluid.

The shell-side fluid shell-side fluid flow path originates with shell-side inlet nozzle 130 of transverse shell 103. In a preferred embodiment, the internal shell-side cavity or space 105 within transverse shell 103 receives the shell-side fluid from the shell inlet nozzle 130 in an open un-tubed volume or space (e.g. referred to as auxiliary plenum 160 herein) in the transverse shell (see, e.g. FIGS. 1 and 2). The auxiliary plenum 160 is a cumulative volume collectively defined by volumes in the tubeless end portion of the internal shell-side space 105 of transverse shell 103 at the shell-side inlet 120 and by the inlet head 124. The operational benefit is that auxiliary plenum 160 provides a distance and void in the transverse shell 103 for introduction of the shell side inlet flow in a manner which removes or mitigates the risk of impingement erosive damage to the tubes 157 which is a common problem in shell and tube heat exchangers having the shell-side fluid inlet located in close proximity or directly into the tubes. This present design prevents the shell-side fluid flow from impinging directly on the tubes while at its highest velocity directly from the shell-side fluid inlet nozzle 130 by providing extra volume in auxiliary plenum 160 of the transverse shell 103 which is free of tubes. The extra volume provided by the shell-side auxiliary plenum 160 allows the shell-side fluid to expand, thereby reducing its velocity to ameliorate the erosive effects of the fluid stream. In other words, the second plenum 160 provides that the shell-side fluid stream or flow is not delivered in the congested tubed space within the transverse shell thus precluding or minimizing impingement and erosive damage to the tube bends). The auxiliary plenum 160 may be adjusted by increasing/decreasing the axial length of the transverse shell 103 and concomitantly the plenum therein to provide the necessary protection for the tube bundle 150 from erosion by the shell-side fluid.

In one embodiment, the shell-side fluid auxiliary flow plenum 160 in transverse shell 103 has an axial length DV measured along transverse axis TA1 which extends horizontally from the terminal end 124-1 of the shell-side fluid inlet head 124 to the nearest point on shell 103 where the longitudinal shell 101 is attached (as identified in FIG. 2). In one embodiment, DV is at least ¼ the axial length of the transverse shell 103 measured between the terminal ends 124-1, 125-1 of its opposing heads 124, 125 respectively to provide space for expanding the inlet shell-side fluid.

The shell-side fluid flow is introduced in a flow direction axially aligned and parallel to transverse axis TA1 and short sections 153 of tubes 157. The shell-side fluid is thus introduced to flow in an axially straight direction in line with and directly towards the outlet tubesheet 111 as shown in FIGS. 1 and 2. The shell-side fluid flow is directed towards and encounters the tube bends 154 of tube bundle 150 before changing direction 90 degrees and flowing through the longitudinal shell 101 in a flow direction axially aligned and parallel to longitudinal axis LA1. The tube bends 154 are thus subjected to shell-side fluid at its highest temperature from shell-side inlet 120 thus providing final heating and increase in temperature of the tube-side fluid immediately before exiting the tubes 157 from the tubesheet 111 into the tube-side fluid outlet flow plenum 136.

With continuing reference to FIGS. 1 and 2, the shell-side fluid SSF enters the auxiliary plenum 160 of transverse shell 103 from the shell-side inlet nozzle 130 at the shell-side inlet 120. The shell-side fluid changes direction and flows 90 degrees through the longitudinal shell 101 to the outlet nozzle(s) 132 where the shell-side fluid leaves the heat exchanger 100 in a radial direction oriented parallel to the inlet direction of the fluid into the heat exchanger. In one embodiment, the shell-side fluid may leave the heat exchanger in the same direction as the shell-side fluid inlet flow (albeit spaced apart and not in the same horizontal plane).

Tube-side nozzles 133 and 131 may be seal welded to their respective heads 126, 125 to form a leak proof fluid connection. Heads 126, 125 are in turn seal joined via welded connections or flanged bolted connections to their respective tubesheets 110, 111. Shell-side nozzles 130 and 132 are similarly seal welded to head 124 and the circumferential wall of shell 101 respectively. Nozzles 130, 131, 132, and 133 are each provided with terminal ends configured for fluid connection to external piping such as via welding, flanged and bolted joints, or other types of mechanical fluid couplings. In one embodiment, each of the nozzles 130-133 may be provided with weld end preparations for connection to external piping. Nozzles 130-133 are relatively short fluid coupling structure generally having a length less than a diameter of their respective shells 101 or 103 to which they are attached or integrally formed there-with. Nozzles 130-133 may be made of any suitable metal such as steel and alloys thereof as some non-limiting examples.

Referring to FIGS. 1 and 6A-6C, heat exchanger 100 further includes a plurality of baffles 170 arranged transversely inside the longitudinal shell 101 to support the tube bundle 150 and maintain lateral spacing between the tubes 157. Each baffle is formed of a suitable flat metal plate which includes a plurality holes to allow the tubes to pass through the baffles. Portions of the baffle plates where tubes are not present may of course be solid. The baffles may be supported by longitudinally-extending tie rods 175 coupled between the baffles for added stability against the shell-side fluid flow (schematic example of which is shown in FIG. 1 represented by dashed lines). The tie rods 175 maintain the longitudinal spacing between the baffles 170.

The baffles 170 force the shell-side fluid to change direction and flow transversely across the tubes while increasing velocity to improve heat transfer performance and efficiency. FIGS. 6A-C show the typical shell-side fluid flow represented by directional flow arrows that is produced by some of the example baffles shown. Any type or combination of different types of baffles 170 may be used. Examples of commonly used baffles 170 well known in the art include single segmental baffles 171 (FIG. 6A), double segmental baffles 172 (FIG. 6B), triple segmental baffles (not shown), disc and donut baffles (FIG. 6C), etc. Where minimization of the shell side pressure loss is an important consideration, non-segmental baffles (not shown) may be utilized to maintain the shell-side fluid flow in an essentially axial direction. Such baffles, well known in the art without undue elaboration, generally comprise an open latticed structure formed by a plurality diagonally intersecting straps or plates forming diamond shaped openings as shown. The heat exchanger tubes pass through the openings. Regardless of the type(s) of baffles used, the number and longitudinal spacing between the baffles may be selected to insure freedom from and minimize of flow induced destructive tube vibrations which can lead to tube ruptures.

In some embodiments as shown in FIG. 1, baffles 170 may be omitted from the transverse shell 103 due to the relatively short length of the shell in contrast to the longer longitudinal shell 101. As shown, there are no straight sections of tubing 157 within the transverse shell 103 other than the end portions of the tubes which extend through the outlet tubesheet 111. In other embodiments where the transverse shell 103 may have greater lengths, baffles may be added as necessary to reduce shell-side fluid flow induced vibrations in the tubes. In yet other possible embodiments regardless of the length of the transverse shell 103, the curved tube bends 154 may be supported by an appropriately configured baffle 170.

In order to further protect the tubesheets 110, 111 from erosion caused by the flow of shell-side fluid, the inboard surface or face 138 may be protected by a flow blocker plate 139. Referring to FIGS. 2-4, the flow blocker plates 139 are substantially flat or planar and rigidly-sealably coupled to the longitudinal and transverse shells 101, 103 such as via circumferential welds. The block plates 139 are circular and have a diameter coextensive with the diameter of the tubesheets 110, 111 at their inboard faces 138 (which may be less than the outside diameters of the tubesheets) within the shell-side spaces 104, 105. Blocker plates 139 are oriented parallel to the tubesheet inboard faces 138 and preferably may be spaced apart as shown forming discrete structures separate from the tubesheets 110, 111. Each plate 139 includes a multitude of circular through holes 139-1 through which the tubes 157 may pass to the tubesheets. The blocker plates 139 are not connected in any way to the tubesheets in preferred embodiments.

In heat exchangers subject to thermal transients, special attention preferably should be given to the bonnet or channel (e.g. head) to tubesheet/shell joint where the parts may be at significantly different temperatures. The differential temperature problem may be most prevalent at the tubesheet/shell joint at the tube-side fluid inlet 122 end of the longitudinal shell 101. A joint design detail that minimizes the thickness of the tubesheet's rim (peripheral un-tubed region) and provides for radial flexibility to accommodate differential radial expansion may therefore be necessary. FIG. 3 shows such an exemplary detail. The tubesheet 110 may include a first portion 110-1 welded to head 126 having a first diameter and a second portion 110-2 welded to longitudinal shell 101 having a second diameter smaller than the first diameter. An annular stepped transition portion 110-3 is formed between portions 110-1 and 110-2 which extends circumferentially around the outer surface of the tubesheet 110. Transition portion 110-3 may be angled in one embodiment as shown to minimize the stress concentration factor in the tubesheet base material at the transition (as opposed to a 90-degree transition). An oblique transition angle A1 is formed between the larger and smaller diameter portions 110-1 and 110-2 for such an angled transition portion 110-3. Angle A1 is between 90 and 180 degrees, preferably between 110 and 170 degrees, and more preferably between 120 and 160 degrees. In one non-limiting example, angle A1 may be about 120 degrees.

In those applications where the heat exchanging streams undergo a significant temperature change, the two tubesheets 110, 111 may be at significantly different temperatures. In such cases, it may be commercially advantageous to utilize two different tubesheet materials. In some embodiments, a thermal liner 144 may also be employed in the tubesheet-related heads 125, 126 to alleviate the effect of transients in the tubeside fluid (see, e.g. FIGS. 3 and 4). The liner 144 may be configured for and in conformal contact with the interior surface of the heads 125, 126 thereby conforming to the shape of head interior surface. The liners 144 may be formed of the same or a different material than the heads. The liners may be formed of metal in one embodiment. Any suitable method of applying or attaching the liners to the heads may be used. In some embodiments, the liners 144 may be a metallic coating conformably applied to the interior surface of the heads 125, 126.

It also bears noting the use of flow blocker plates 139 previously described herein, which are spaced apart from the inboard faces 138 of the tubesheets 110, 111, creates a stagnant flow space or area at the shell/tube-sheet interface region that may also help mitigate the effect of thermal transients in addition to protecting the tubesheets from shell-side flow erosion.

According to another aspect of the invention, a plurality of the basic T-shaped heat exchanger 100 may be combined and closely coupled together physically and fluidly in a variety of different ways to produce a compound heat exchanger unit comprising an assembly of multiple heat exchanger 100 to suit particular application needs. The T-shaped heat exchangers 100, which forms the basic building block for constructing multi-unit heat exchanger systems or assemblies, is particularly amenable to such use.

Figure 7:
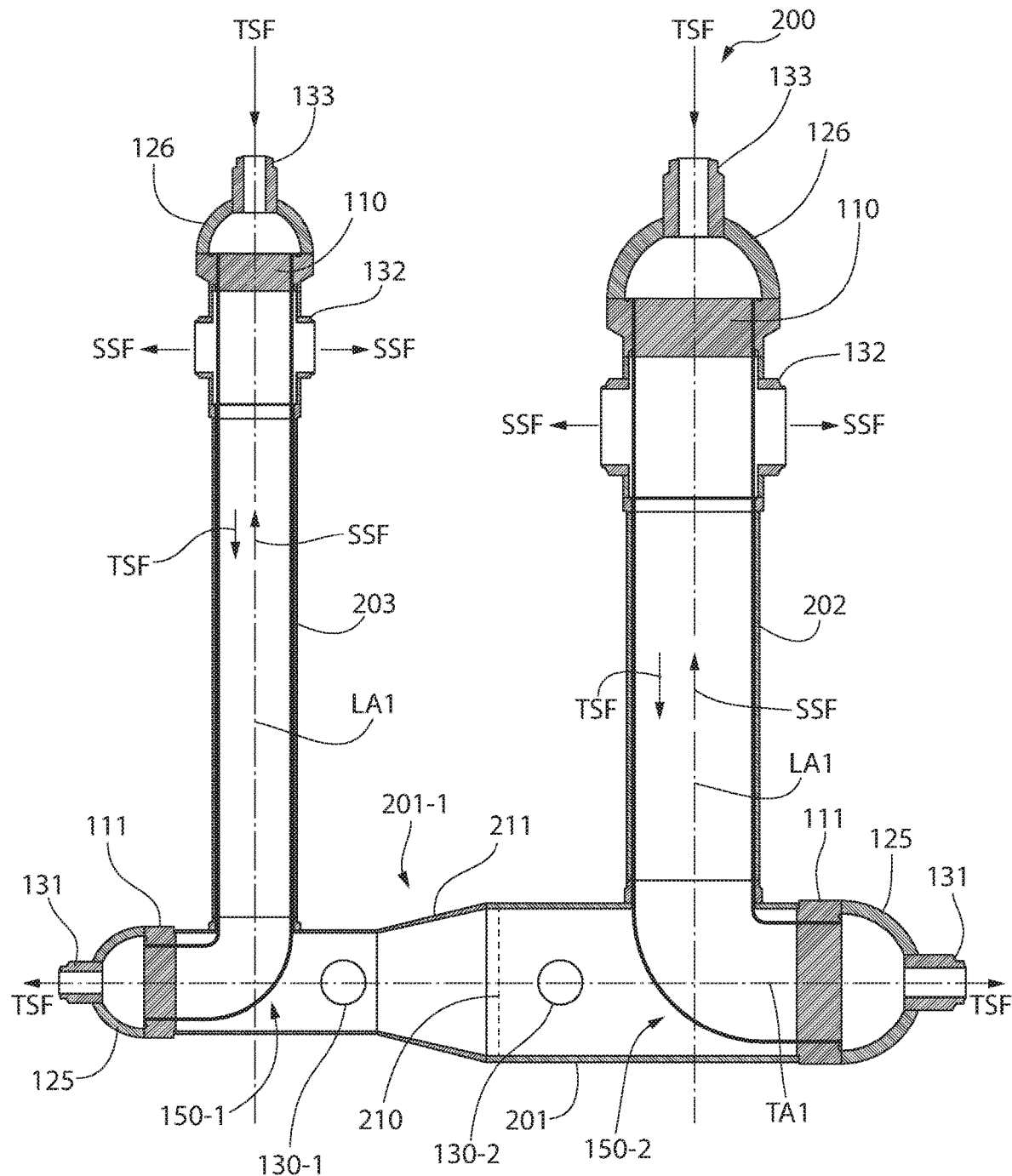
FIG. 7 shows a heat exchanger unit combining two heat exchangers of FIG. 2 sharing a common transverse shell.

One example of a double/dual heat exchanger unit 200 is shown in FIG. 7. In this embodiment, the transverse shells of the two heat exchangers 100 are combined into an elongated single common transverse shell 201. Transverse shell 201 may be horizontally oriented as shown in this non-limiting orientation (recognizing that heat exchanger unit 200 and transverse shell 201 can have any orientation such as vertical or angles between horizontal and vertical similarly to transverse shell 103). Heat exchanger unit 200 includes two vertically oriented longitudinal shells 202, 203 structured similarly to and having the same appurtenances as longitudinal shell 101 (e.g. tubesheets, heads, liners, nozzles, etc.). Longitudinal shells 202, 203 may be the same or different lengths/heights. Transverse shell 201 is structured similarly to and has the same appurtenances as two combined transverse shells 103 with an opposing pair of axially aligned tubesheets 111 (one at each end of the shell 201). Additional reference is made back to FIGS. 1 and 2 and previous description herein for details of the heat exchanger basic unit and construction.

Longitudinal shells 202 and 203 of heat exchanger unit 200 are horizontally/laterally spaced apart forming an intermediate section 201-1 in transverse shell 201 therebetween. Heat exchanger unit 200 has a generally U-shaped structure. The two upright longitudinal shells 202, 203 may have an orientation such as vertical (shown), horizontal in the same plane as transverse shell 201, or rotated to any angle between vertical and horizontal. The transverse shell 201 may similarly have any of the foregoing orientations, which will then dictate the orientation of the longitudinal shells 202, 203 coupled thereto. The entire heat exchanger 200 therefore may have any suitable orientation.

In one embodiment, a pair of shell-side fluid inlet nozzles 130-1, 130-2 are provided in intermediate section 201-1 which introduce the shell-side fluid (SSF) flow into the transverse shell 201 between the pair of tube-side outlet tubesheets 150. One inlet nozzle 130-1 may be proximate to J-shaped tube bundle 150-1 and the other nozzle 130-2 may be proximate to the other J-shaped tube bundle 150-2. The two separate shell-side fluid inlet flows may mix and combine within the transverse shell 201 to a certain degree because the transverse shell 201 is in fluid communication with each of the longitudinal shells 202, 203. However, basic flow dynamics provides that there will be a flow bias which directs the shell-side fluid to flow more preferentially towards the longitudinal shell which is nearest to each shell-side fluid inlet nozzle.

The foregoing dual shell-side fluid inlet nozzles 130-1, 130-2 allows shell-side fluid to be introduced into the heat exchanger unit 200 from two different sources (e.g. different steam extraction stages with different temperatures/pressures from a steam turbine of a Rankine cycle power generation plant). The dual SSF flows may mix and equalize in pressure and temperature within the transverse shell 201. In other embodiments, a flow partition plate 210 (shown in dashed lines in FIG. 7) may be provided which divides the intermediate section 201-1 of transverse shell 201 into two separate shell-side spaces to keep the shell-side fluid inlet flow fluidly isolated from one another. Alternatively, a shell-side fluid from a single common source may simply be bifurcated in piping upstream of the heat exchanger unit 200 and supplied to each inlet nozzle to better distribute the SSF flow in the transverse shell 201. In yet other embodiments, a single shell-side fluid inlet nozzle may be provided which is fluidly coupled to intermediate section 201-1 of transverse shell 201 without any internal partition plate to supply shell-side fluid flow to each longitudinal shell 202 and 203. Numerous options are therefore possible for introducing and sourcing a shell-side fluid for heat exchanger unit 200.

Both the shell-side fluid and tube-side fluid flow paths are indicated by the directional flow arrows shown in FIG. 7 and comport with the countercurrent flow arrangement depicted in FIGS. 1 and 2, as previously described herein. It will not be repeated here for sake of brevity.

The two basic T-shaped heat exchangers 100 combined in the heat exchanger unit 200 of FIG. 7 may be of the same or different size/heat transfer capacity depending on the particular application needs. FIG. 7 shows an example of two different size heat exchangers 100 each with different diameter longitudinal and transverse shells than the other that have been combined and joined via the common transverse shell 201. In such an embodiment, a reducer 211 may be provided between the larger diameter portion of the transverse shell 201 associated with longitudinal shell 202 on the right and the smaller diameter portion of the transverse associated with longitudinal shell 203 on the left. In other possible embodiments, a single diameter transverse shell 201 may be provided even if the individual heat exchanger 100 used in heat exchanger unit 200 have different diameters thereby eliminating the reducer. Because the two tube bundles 150-1, 150-2 will have different outer diameters (defined collectively by the individual tubes 157 in each bundle), this latter single diameter transverse shell might not be optimum to extract the most heat from the shell-side fluid in the smaller diameter heat exchanger 100.

Figure 8:
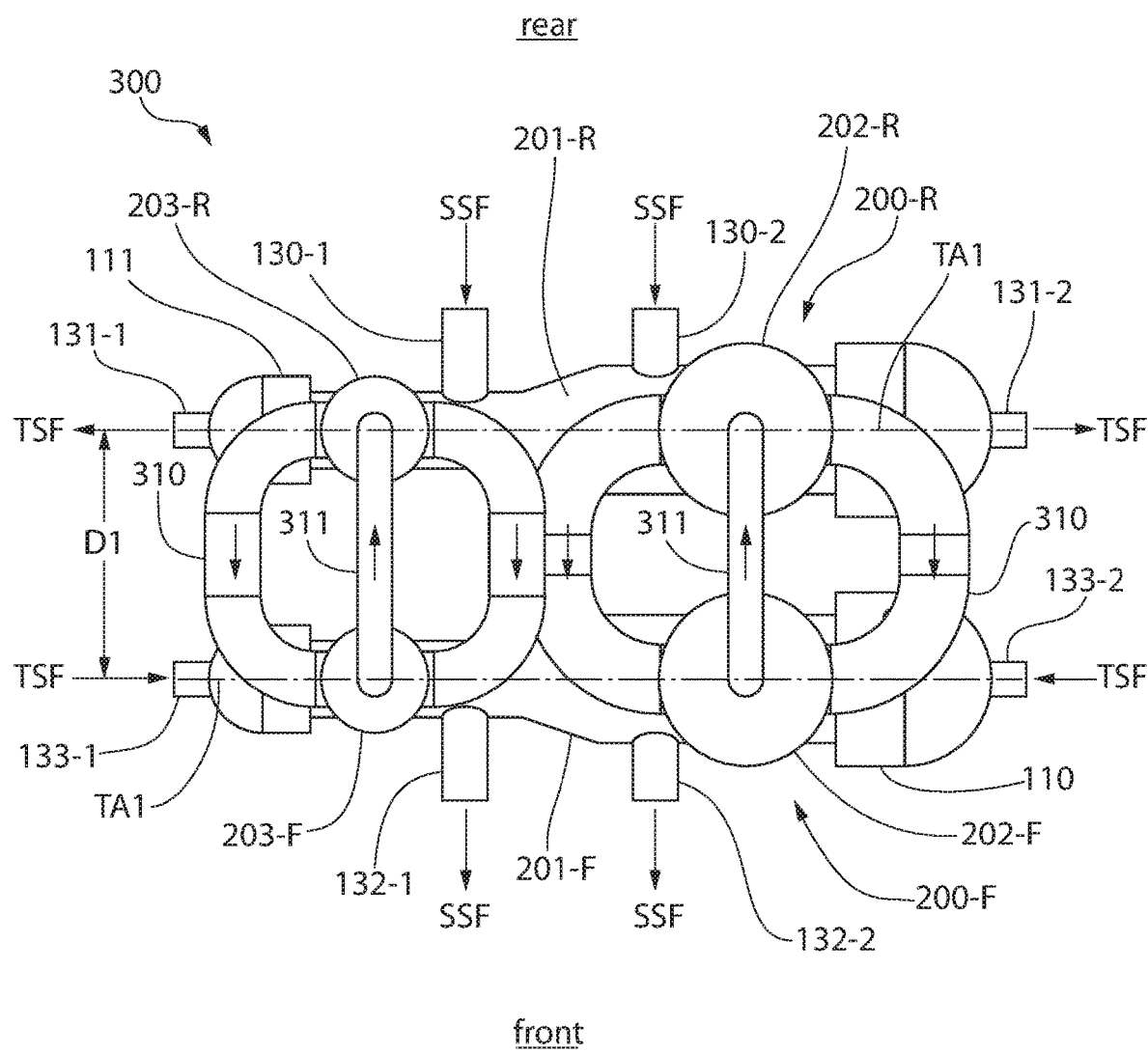
FIG. 8 is top plan view of a heat exchanger system combining two heat exchanger units of FIG. 7.
Figure 9:
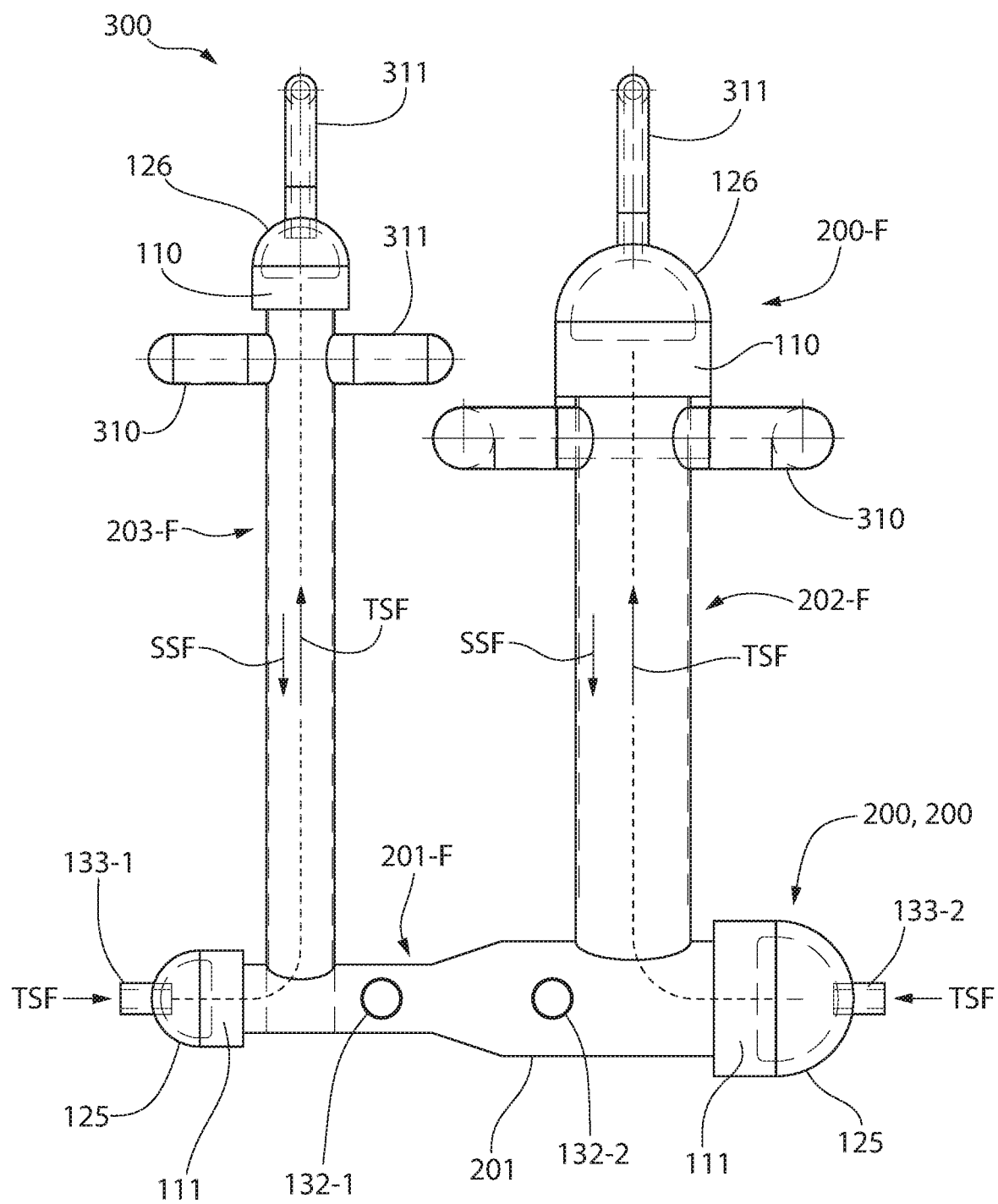
FIG. 9 is front view thereof.
Figure 10:
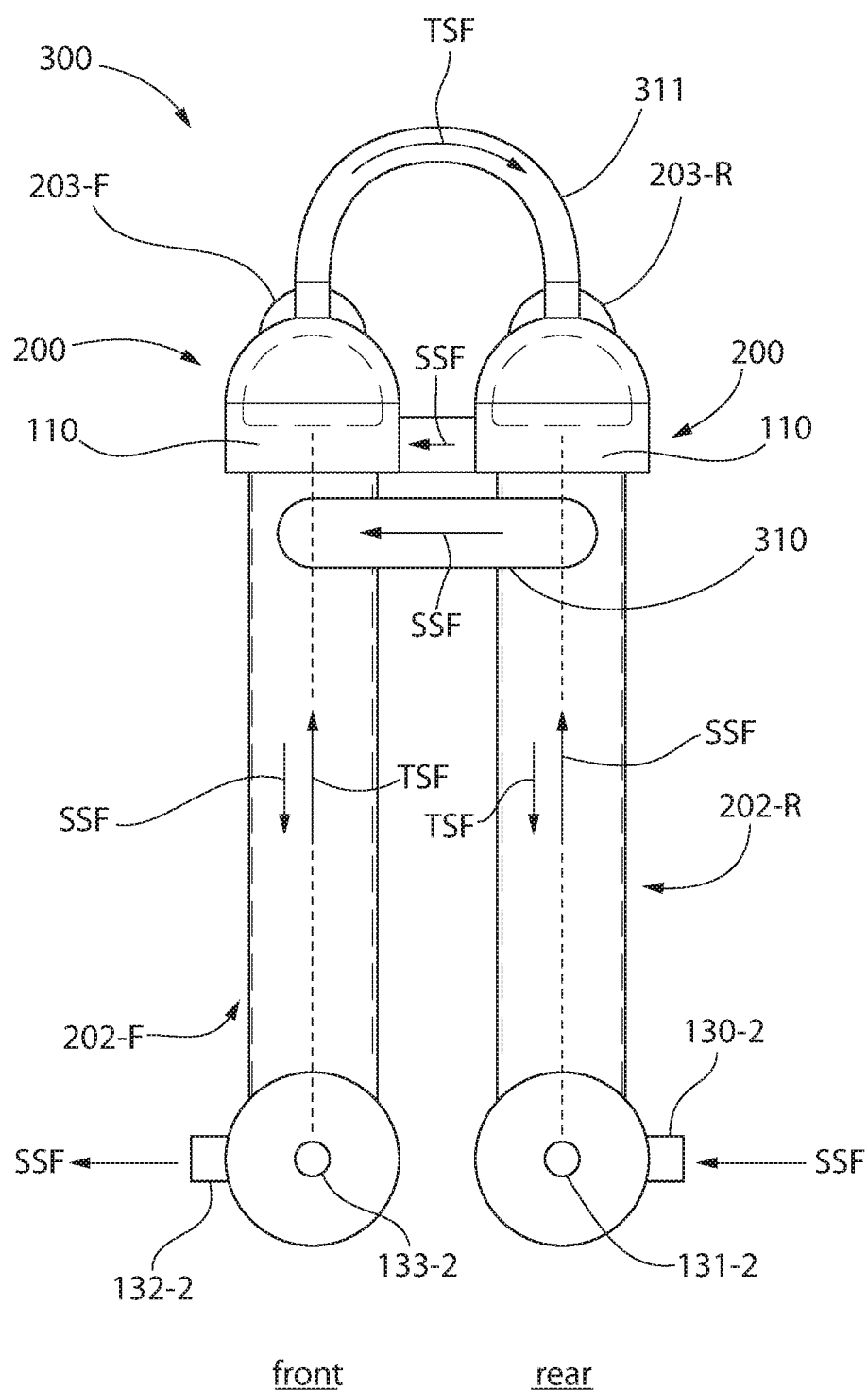
FIG. 10 is a right side view thereof.

According to another aspect of the invention, the dual heat exchanger assembly or unit 200 of FIG. 7 may be used in turn to construct a modular heat exchanger system 300 comprising two or more heat exchanger units 200. FIGS. 8-10 shows a non-limiting exemplary arrangement of a modular heat exchanger system 300 combining two heat exchanger units 200 to provide a set of four J-tube heat exchangers 100 in total. The J-tube heat exchangers can be installed in at least partial series flow arrangement to facilitate the segregation of heat exchanger materials commensurate with their strength versus temperature capabilities for the shell-side and tube-side fluids encountered. The number of tubes 157 in each shell, tube diameter, and tube material as well as the shell diameters may each be the same or different in the multiple heat exchanger unit to provide design flexibility.

In some embodiments, both low and high pressure heat exchangers may be combined in a single assembly of a modular heat exchanger system 300 when at least the shell-side fluids are isolated using flow partition plates 210 in the transverse shells 201 as previously described herein. As shown in FIGS. 8-10, as one non-limiting example, the smaller diameter shells shown may correspond to higher shell-side pressure heat exchangers and the larger diameter shells shown may correspond to lower shell-side pressure heat exchangers. Because the higher pressure heat exchangers receive a shell-side fluid (e.g. steam, liquid water, or other fluid) that will generally have a higher temperature and pressure, the thermal energy in this fluid is greater requiring less tube surface area to effectively heat the tube-side fluid with the shell-side fluid to the desired temperature. The tube bundles in higher pressure heat exchangers may therefore comprise a smaller number of tubes to achieve the desired heat transfer which translates into a smaller diameter shell requirement.

For convenience of reference, the pair of heat exchanger units 200 combined in FIGS. 8-10 will be described as a "front" unit 200-F and a "rear" unit 200-R for convenience of reference in describing the modular heat exchanger system 300. Each heat exchanger unit may be shop prefabricated in whole or at least partially and shipped to the installation site. Advantageously, this reduces field work and allows a majority of the heat exchanger units to be fabricated under controlled factory conditions.

Front heat exchanger unit 200-F includes longitudinal shells 202-F and 203-F axially spaced apart on the common front transverse shell 201-F. Similarly, rear heat exchanger unit 200-R includes longitudinal shells 202-R and 203-R axially spaced apart on the common front transverse shell 201-R. Transverse shells 201-F, 201-R may be shaped similarly to common transverse shell 201 shown in FIG. 7. The heat exchanger units 200-F, 200-R are preferably closely coupled together and tightly spaced apart to form an integrated compact multi-heat exchanger assembly or unit amenable to complete or partial shop prefabrication. This is distinct from merely fluidly connecting several discrete heat exchanger together via long piping runs as in past heat exchanger installation practices in the power generation industry which consume a significant amount of valuable and limited available floor space. For example, in some preferred embodiments the front and rear transverse shells 201-F, 201-R may be spaced apart by a distance D1 measured between their respective transverse axes TA1 which is less than 4 times the largest diameter of the transverse shells, preferably less than 3 times the largest diameter. In a certain example, distance D1 may be about 2 times the largest diameter as shown in FIG. 8.

Advantageously, the multi-unit heat exchanger system 300 therefore combines several heat exchangers into a single compact package having a relatively small footprint attributable in part to the direct coupling of some of the transverse shells together as described herein. This preserves valuable available space within the power generation or other plant for other system equipment.

With reference to FIG. 7 showing the basic heat exchanger unit 200 and FIGS. 8-10, the front heat exchanger unit 200-F includes a pair of opposed tube-side fluid inlet nozzles 133-1, 133-2 and a pair of shell-side fluid outlet nozzles 132-1, 132-2. The rear heat exchanger unit 200-R includes a pair of opposed tube-side fluid outlet nozzles 131-1, 131-2 and pair of shell-side fluid inlet nozzles 130-1, 130-2. The arrangement of heads 125, 126 and tubesheets 110, 111 is shown in FIG. 7.

In the foregoing figures, the two larger shell diameter longitudinal shells 202-F, 202-R are fluidly coupled together on both the shell-side and tube-side by external cross flow piping segments 310, 311. The shell-side cross flow piping segments are designated 310 and the tube-side cross flow piping segments are designated 311. The two smaller diameter longitudinal shells 203-F, 203-R are similarly fluidly coupled together by external cross flow piping segments 310, 311. The flow arrows show the flow direction of both the shell-side and tube-side fluids. Each of the cross flow piping segments 310, 311 may be U-shaped piping segments, which may preferably be shop fabricated as piping spools for preferably field welding and/or flanged/bolted connection directly to their respective nozzles of longitudinal shells. The tube-side cross flow piping segments 311 may be vertically oriented as shown in one embodiment. The shell-side cross flow piping segments 310 may be horizontal oriented as shown in one embodiment. Any suitable type of metal such as preferably steel piping may be used for the cross flow piping segments.

In some embodiments, partition plates 210 as previously described herein may be disposed inside both front and rear common transverse shells 201-F, 201-R to fluidly isolate the shell-side fluids flowing the longitudinal shells 202-F, 202-R and the longitudinal shells 203-F, 203-R. The partition plate option is useful when combining both low and high pressure heat exchangers in the multi-unit modular heat exchanger assembly or system 300.

It bears noting the pairs of transverse shells 201-F, 201-R, larger diameter longitudinal shells 202-F, 202-R, and smaller diameter longitudinal shells 203-F, 203-R need not be identical in diameter, exterior dimensions (height/length), and/or configuration in each pair as shown in FIGS. 8-10. Accordingly, they may be customized and different in certain other embodiments to fit a particular application need.

Figure 11:
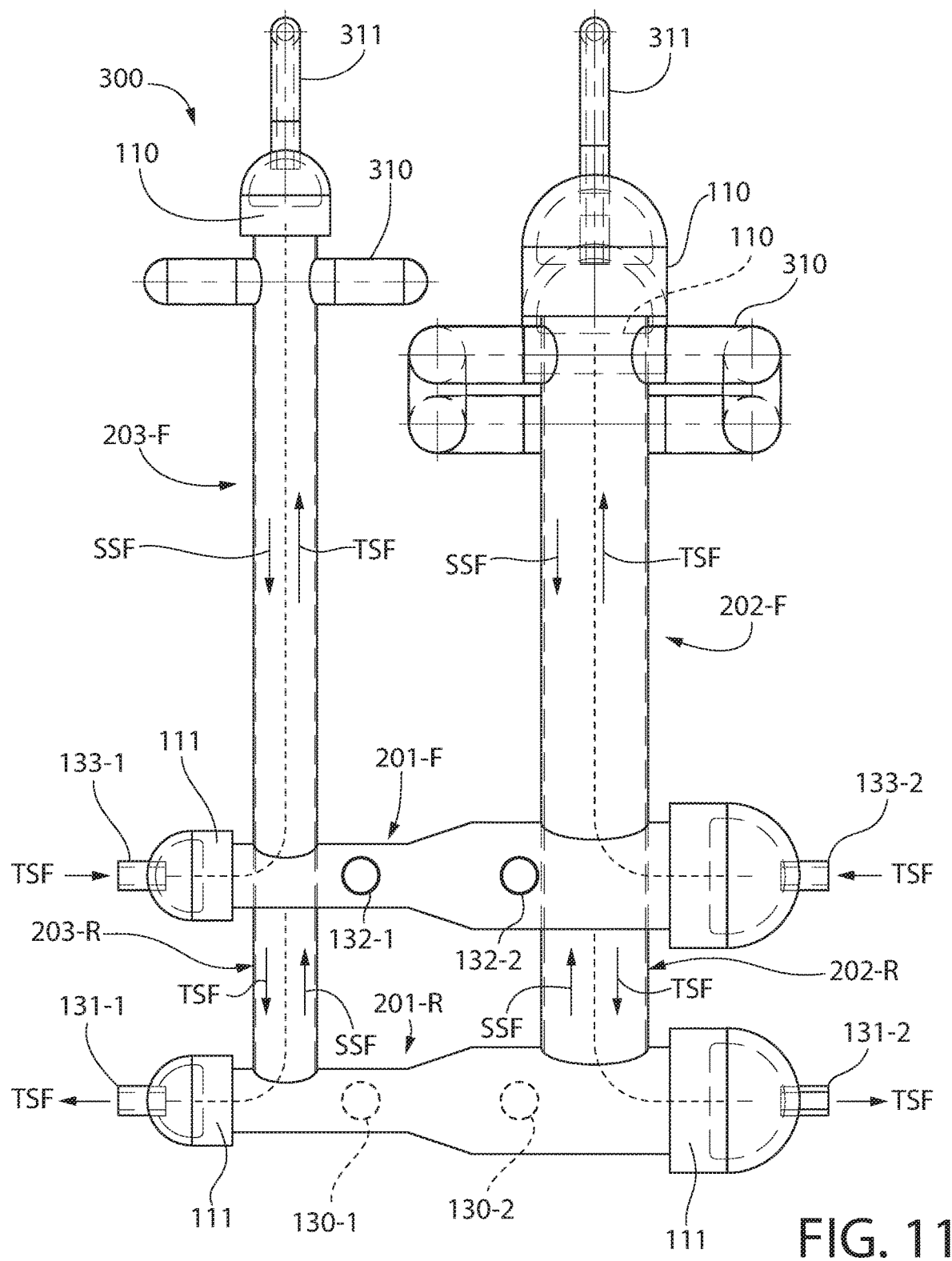
FIG. 11 is a front view thereof showing an alternative arrangement of vertically offset front and rear common transverse shells.
Figure 12:
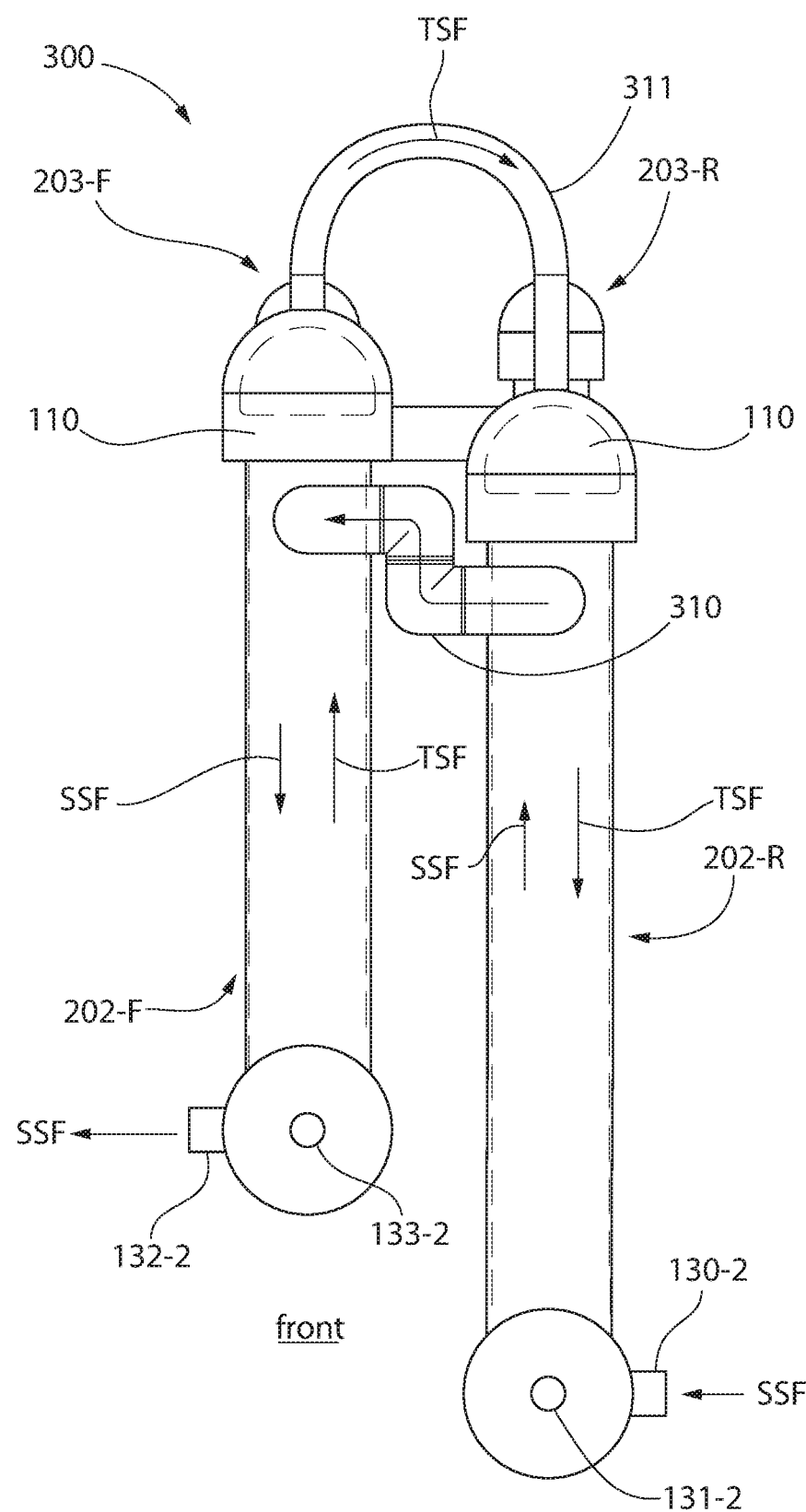
FIG. 12 is right side view of the alternative arrangement.
Figure 13:
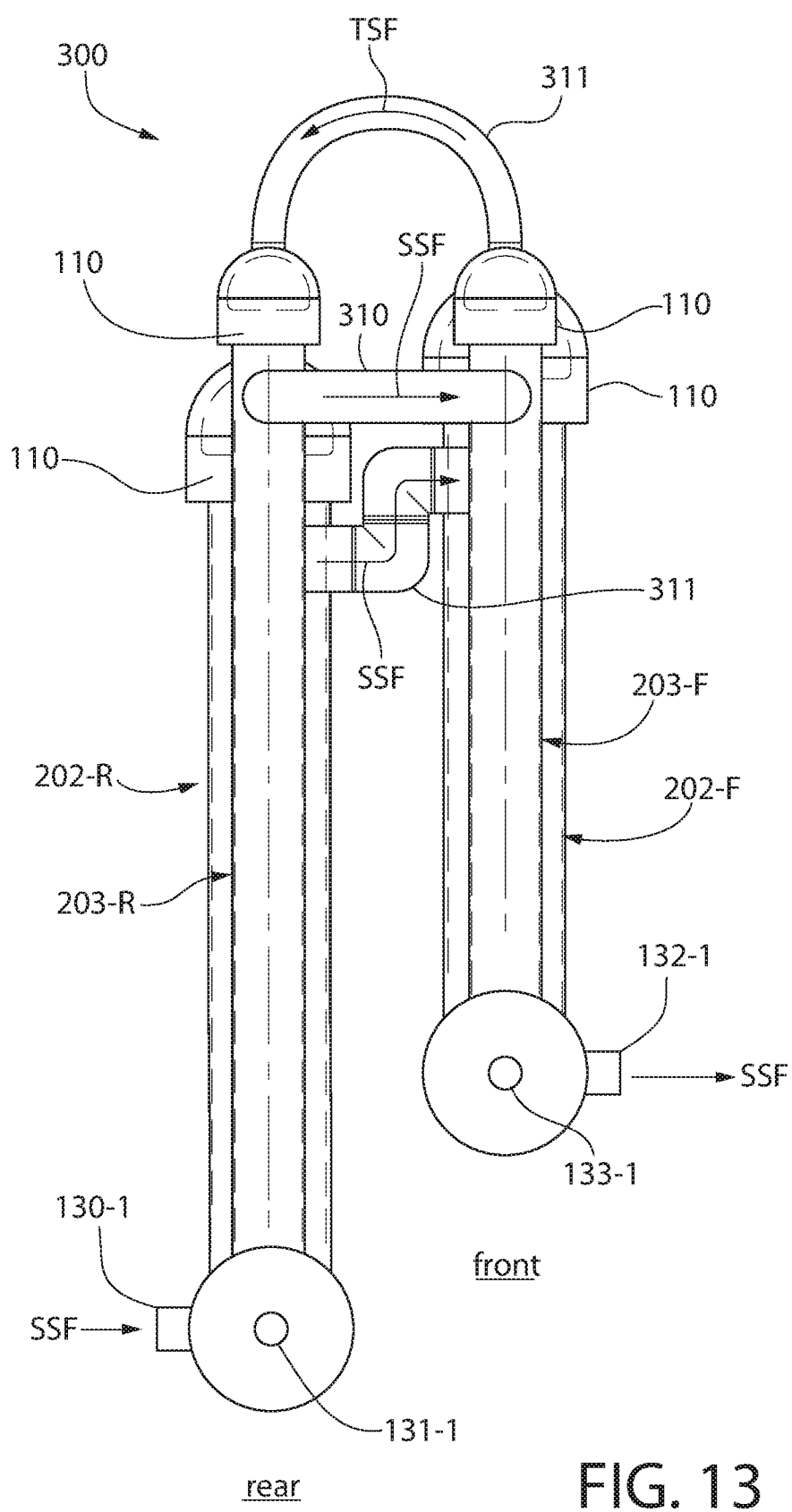
FIG. 13 is a left side view of the alternative arrangement.

In FIGS. 8-10, the common traverse shells 201-F, 201-R are arranged at the same elevation. This may be acceptable for new installations. However, in other embodiments the common transverse shells 201-F, 201-R may instead be located at different elevations relative to each other as shown in FIGS. 11-13. Some of the longitudinal shells may be vertically offset from each other if not compensated for by a decrease/increase in height/length. As an example, the two larger diameter longitudinal shells 202-F, 202-R are depicted as vertically offset such that the cross piping segment 311 is will require a pair of 90 degree elbows as shown due to the SSF outlet nozzles 132 being vertically offset. Such an alternative arrangement as shown in FIGS. 11-13 may be useful or required in retrofit applications to avoid existing building structure and equipment. In top view, this alternative embodiment would appear the same as in FIG. 8 which should be referenced additionally. In short, the modular heat exchanger system 300 has considerable flexibility in design to accommodate a variety of installation requirements. This latter alternative arrangement is constructed in accordance with same principles and features already described herein for heat exchanger system of FIGS. 8-10, which will not be repeated here for sake of brevity.

The heat exchangers 100, dual heat exchanger unit 200, and modular heat exchanger system 300 may be supported in any manner via suitable structural supports mounted to the flooring, decks, or superstructure. Use of spring type supports to reduce thermal constraint, while supporting heat exchanger weight may be used, in conjunction with selection of sufficiently flexible interconnecting pipe spools used for the cross flow piping connections.

The heat exchangers 100, dual heat exchanger unit 200, and modular heat exchanger system 300 disclosed herein may be used in numerous applications where it is intended to heat/cool a first tube-side fluid with a second shell-side fluid. In one application, the present heat exchangers may be used in a nuclear power, fossil fuel, biomass, solar, or power generation station operating a Rankine cycle for electric power production (see, e.g. FIG. 142). The present heat exchanger or multi-unit heat exchangers may be used for any or all of the high and/or lower pressure feedwater heaters depicted using water as the tube-side fluid and steam as the shell-side fluid. The present heat exchangers however may be used in numerous other applications and industry for fluid heating applications, such as for example without limitation petroleum refining, chemical production plants, or various industrial applications. Accordingly, the invention is not limited to any particular application alone in its scope or applicability.

Additional advantages of the heat exchangers 100 and 200 disclosed herein include: a compact space requirement; maximum flexibility with respect to installation and orientation; reduced risk of severe stresses from restraint of thermal expansion; ability to withstand thermal and pressure transients is enhanced; and the shell-side pressure loss in the flow stream is minimized for optimal heat transfer performance by use of non-segmental baffles.

Any of the foregoing heat exchangers when used in a Rankine cycle of a power generations plant may be used as feedwater heaters, various process heaters, and/or steam generators in the case of a nuclear power plant. Other applications not associated with a power plant such as in the chemical industry or other may of course used the heat exchangers.

Figure 14:
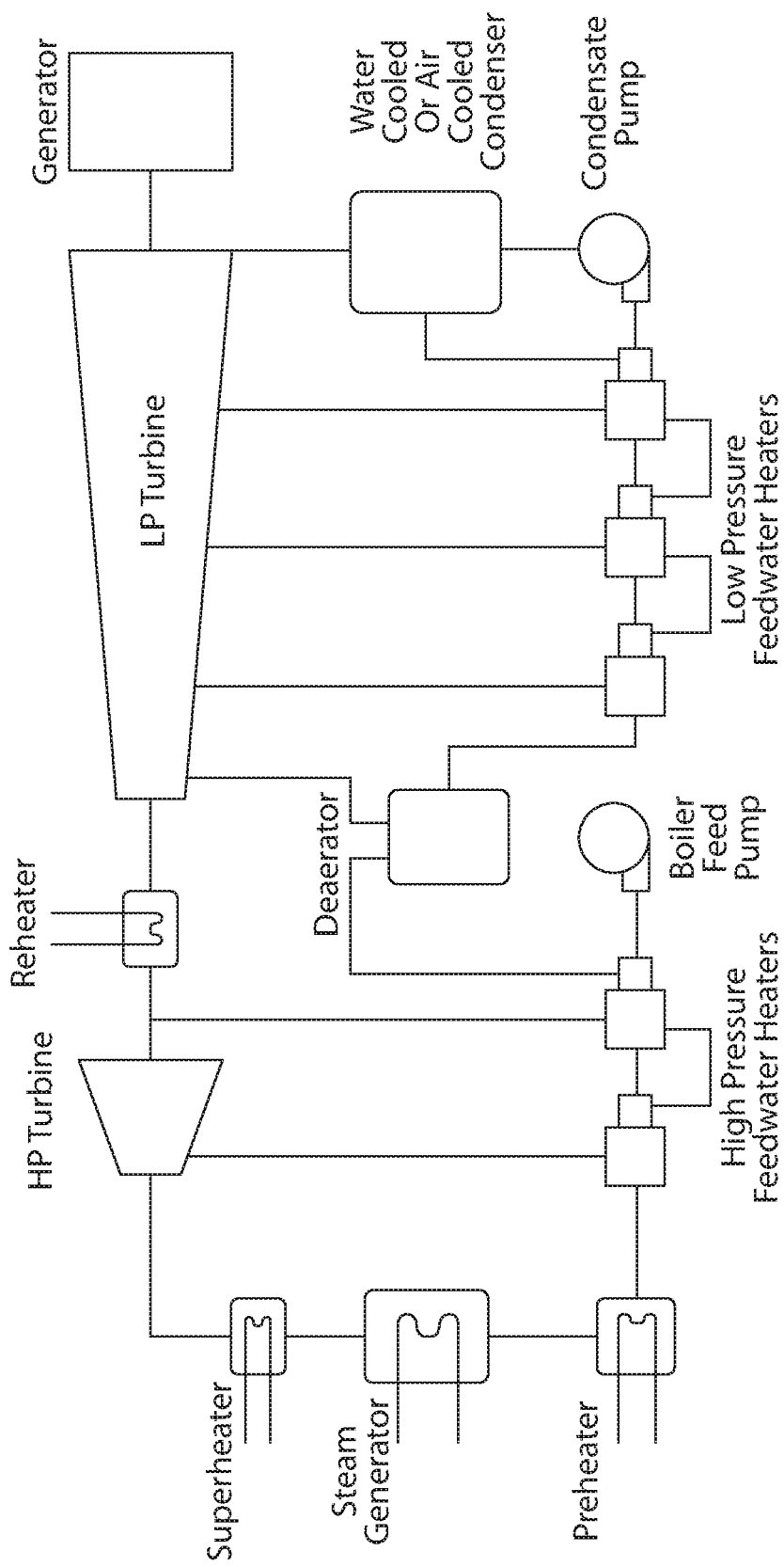
FIG. 14 is a schematic diagram of a Rankine power generation cycle.

According to another aspect of the present disclosure, axial flow tube support baffles are disclosed which maintain uni-directional longitudinal flow of the shell-side fluid through the shell-side space of the heat exchanger in order to advantageously achieve a reduction in shell-side fluid pressure drop. This minimizes pumping requirements and associated costs of the fluid feedwater system in a Rankine power cycle as depicted in FIG. 14. The present axial flow baffles may be used in the foregoing unique heat exchanger configurations with multiple shells sharing common shell-side spaces that benefit significantly from minimum shell-side pressure loss as the shell-side fluid flows through the circuitously flow path arrangement of heat exchanger shells. The present axial flow baffles may also be used with heat exchangers having a singular longitudinally-extending shell (see, e.g. FIGS. 21-23 as some non-limiting examples) where minimal shell-side pressure drop or loss might be beneficial.

According to another aspect of the invention, an axial flow baffle 420 for a heat exchanger is provided which is compatible with the foregoing heat exchangers for minimizing the pumping cost and shell-side pressure loss or drop through the heat exchanger. The complex shell geometries of some of the foregoing heat exchanger designs may generally benefit from a reduction in shell-side pressure loss. The present axial flow baffles is configured to maintain the shell-side fluid flow in a substantially longitudinal and linear path through the shell(s). The present axial flow baffles may also be used in standard single straight shell applications; some non-limiting examples of which are shown in FIGS. 25-28.

Figure 25:
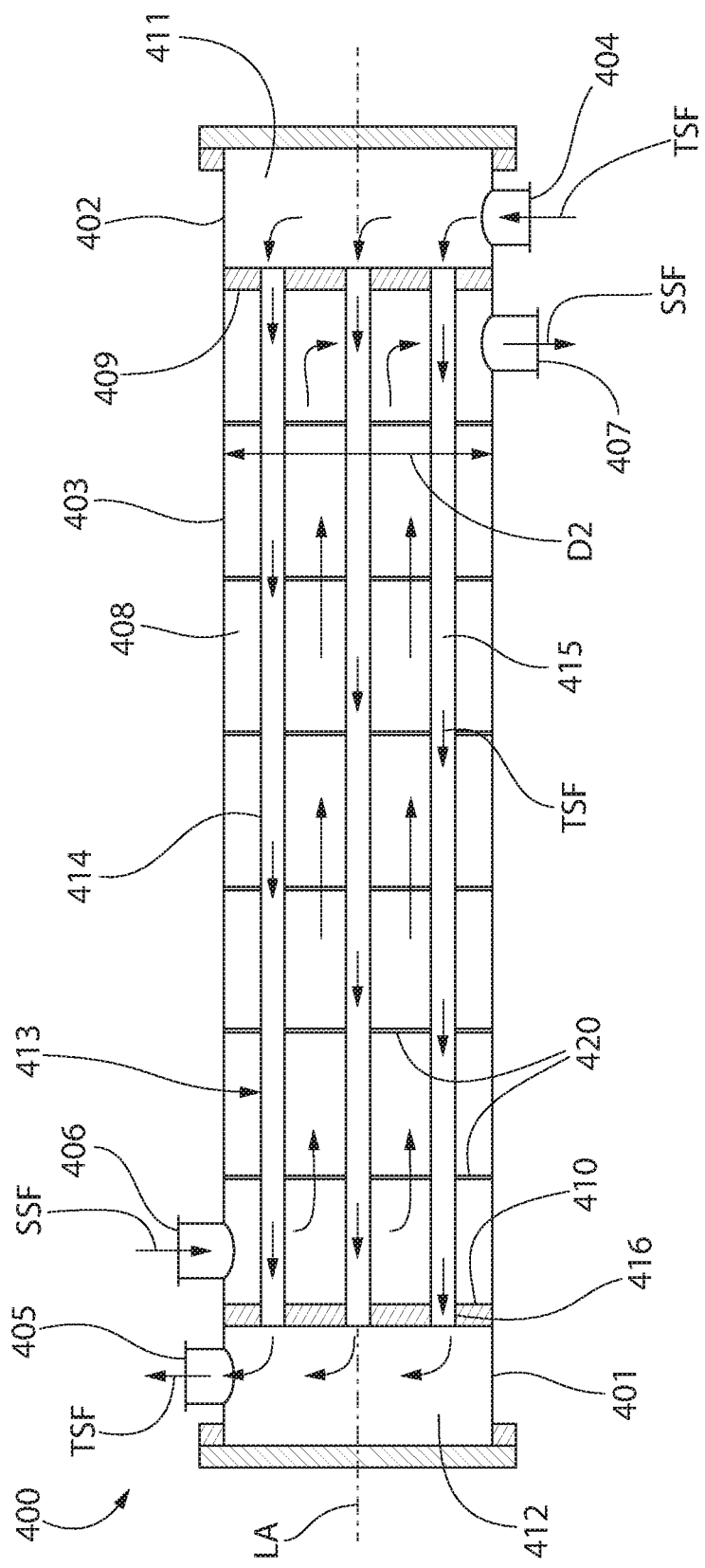
FIG. 25 shows an embodiment of a shell and tube heat exchanger including the axial flow baffles of FIG. 1.

FIG. 25 depicts a non-limiting example of a shell and tube heat exchanger 400 including axial flow baffles 420 to produce longitudinal shell-side flow of the shell-side fluid SSF. Heat exchanger 400 generally includes an elongated longitudinal shell 403 defining an internal shell-side space 408 and a longitudinal axis LA. Shell 403 extends axially between opposing first and second channels or heads 401 and 402 mechanically coupled and sealed to the opposite ends of the shell. Head 402 defines an internal tube-side fluid TSF inlet plenum 411. Head 401 defines an internal tube-side fluid outlet plenum 412. Any suitable form of leak-proof coupling may be used, including for example without limitation seal welding (shown) and mechanical couplings such as gasketed flanged and bolted joints both of which are commonly used in shell and tube heat exchangers depending on the shell-side design pressure. Any other suitable type of leak-proof coupling may be used.

A tube bundle 413 extends through the shell-side space 408 between first and second tubesheets 409, 410. Each tubesheet is sealably coupled to opposing ends of the shell 403 as shown. Tube bundle 413 includes a plurality of parallel tubes 414; the interior of which defines the tube-side space 415 for conveying the tube-side fluid TSF. The opposing ends of the tubes 414 are sealably coupled to the tubesheets 409, 410 by any suitable method known in the art to form leak-proof joints. In some embodiments, the tubes 414 may rigidly and sealably coupled to the tubesheets 409, 410 via expansion, welding, or expansion and welding; these techniques being well known in the art without further elaboration required. Commonly employed tube expansion processes that may be used include explosive, roller, and hydraulic expansion.

The tubes 414 are received through a plurality of through tube penetrations 416 extending completely through the thickness of the tubesheets from side to side which place the tubes in fluid communication with the tube-side fluid inlet and outlet plenums 411, 412 in known fashion. In one embodiment, as shown, the tube bundle 413 may be a straight tube bundle comprising straight tubes. In other embodiments, heat exchangers with U-shaped tube bundles may be used.

The axial flow baffles 420 are spaced axially/longitudinally apart in shell 403 and held in position in the shell and tube bundle by conventional longitudinally-extending tie rods and spacers (not shown). The tie rods are typically cylindrical metal rods or pipes. Such tie rods are well known in the art and subject to TEMA standards regarding number and spacing.

Heat exchanger 400 includes shell-side fluid inlet and outlet nozzles 406, 407 and tube-side fluid inlet and outlet nozzles 404, 405. Nozzles 406, 407 open into and are in fluid communication with shell-side space 408 of shell 403. Tube-side fluid inlet and outlet nozzles 404, 405 are in fluid communication with inlet and outlet plenums 411, 412 in the heads 402, 401. The nozzles each have ends configured for sealed leak-proof fluid coupling to related piping systems of the facility, such as weld ends for weld joints or flanged ends (shown) for gasketed and bolted flange joints. The tube-side and shell-side nozzles may be oriented perpendicularly to the longitudinal axis LA of heat exchanger 400 for introducing or extracting the fluids in a transverse direction to the longitudinal axis. Other arrangements and orientations of nozzles commonly used in the art may of course be used.

The heat exchanger 400 shown is a single pass counter-flow design in which the tube-side fluid TSF passes once through the shell-side space 408 inside the tubes 414. The tube-side fluid flows in an opposing longitudinal direction to the shell-side fluid SSF. Any suitable fluids may used for the shell-side and tube-side fluids. In one embodiment, the shell-side fluid may be steam and the tube-side fluid may be feedwater of a Rankine cycle (see, e.g. FIG. 14) used in a nuclear, fossil, solar, or other type power plant for producing electricity. Other states of fluids and/or types of fluids such as petroleum or chemicals may be processed using heat exchanger 100. For example, both the shell-side and tube-side fluids may be liquid in some applications. Heat exchanger 100 is therefore not limited in the breadth of its applicability and use in an industrial process for heating fluids.

It bears noting in FIG. 25 that axial flow baffles 420 in heat exchanger 400 create longitudinal flow substantially parallel to longitudinal axis LA through the shell 403. The shell-side and tube-side fluid flows are shown by directional flow arrows. The only cross flow in the shell-side space 408 which is not related to or induced by the baffles 420 occurs with the shell-side fluid flow entering or leaving the terminal end portions of the shell at the tubesheets 409, 410 via the shell-side fluid inlet and outlet nozzles 406, 407.

Any suitable metallic materials may be used for the heat exchanger shell, head, tubesheets, and other components; some non-limiting examples of which were previously described herein.

Referring now to FIGS. 15-18A-B, details of axial flow baffle 420 according to the present disclosure are shown. Axial flow baffles 420 are comprised of substantially planar or flat metallic plates defining a circular body including a first major surface 423, a second major surface 424 opposite the first major surface, and a plurality of axial flow tube apertures 422 extending through and between the major surfaces. The major surfaces may be parallel to each other and define a substantially uniform thickness T1 in one embodiment. The foregoing uses of the term "substantially" in this paragraph connote normal mechanical fabrication tolerances and dimensional variations inherent in fabrication and machining operations.

Baffle 420 has a circumferentially-extending peripheral edge 421 of circular shape which defines a diameter D1 of the baffle. Diameter D1 is marginally or just slightly less than the interior diameter D2 of the heat exchanger shell to allow the baffles 420 to be inserted into the shell along with the tube bundle (see, e.g. FIGS. 25-27). The peripheral edge 421 of baffle 420 substantially conforms in shape and is proximate to the interior surface of the shell along all portions of the peripheral edge to prevent any substantially open gaps therebetween which might allow shell-side flow to unintentionally bypass the flow holes in the baffle.

Figure 15:
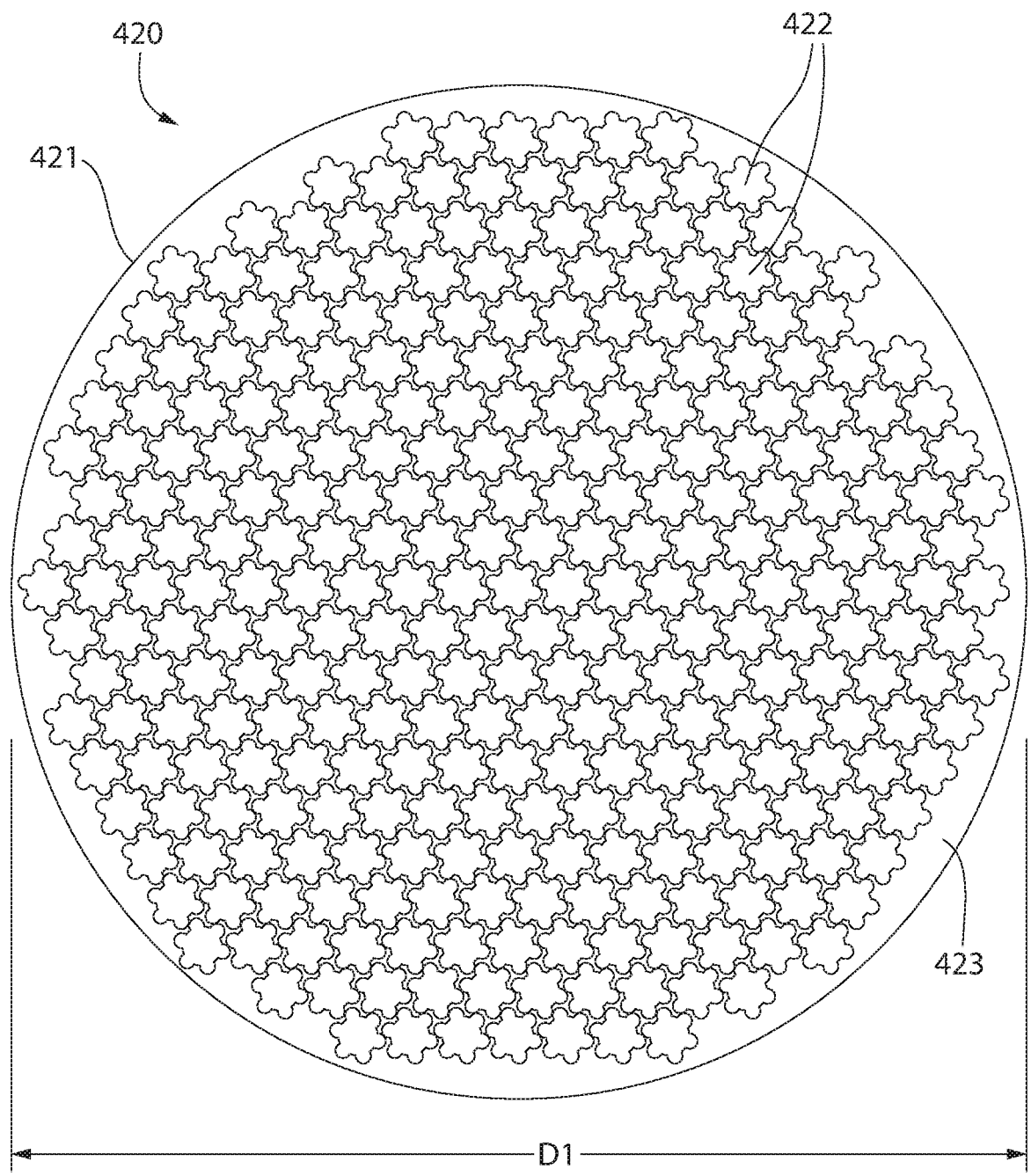
FIG. 15 is a plan view of an axial flow tube support baffle for a shell and tube heat exchanger according to the present disclosure including a plurality of axial flow tube apertures.

In the baffle plate embodiment shown in FIG. 15, the array of tube apertures 422 are dispersed throughout and substantially fills the entire field or face of the axial flow baffle 420 (i.e. major surfaces 423, 424) within the peripheral edge 421. The tube apertures 422 are configured to create longitudinal axial shell-side fluid flow in the shell-side space parallel to longitudinal axis LA. For convenience of description and reference, each tube aperture 422 defines a vertical axis VA and a horizontal axis HA which intersect at the geometric centerpoint C of the aperture (see, e.g. FIG. 17).

Figure 16:
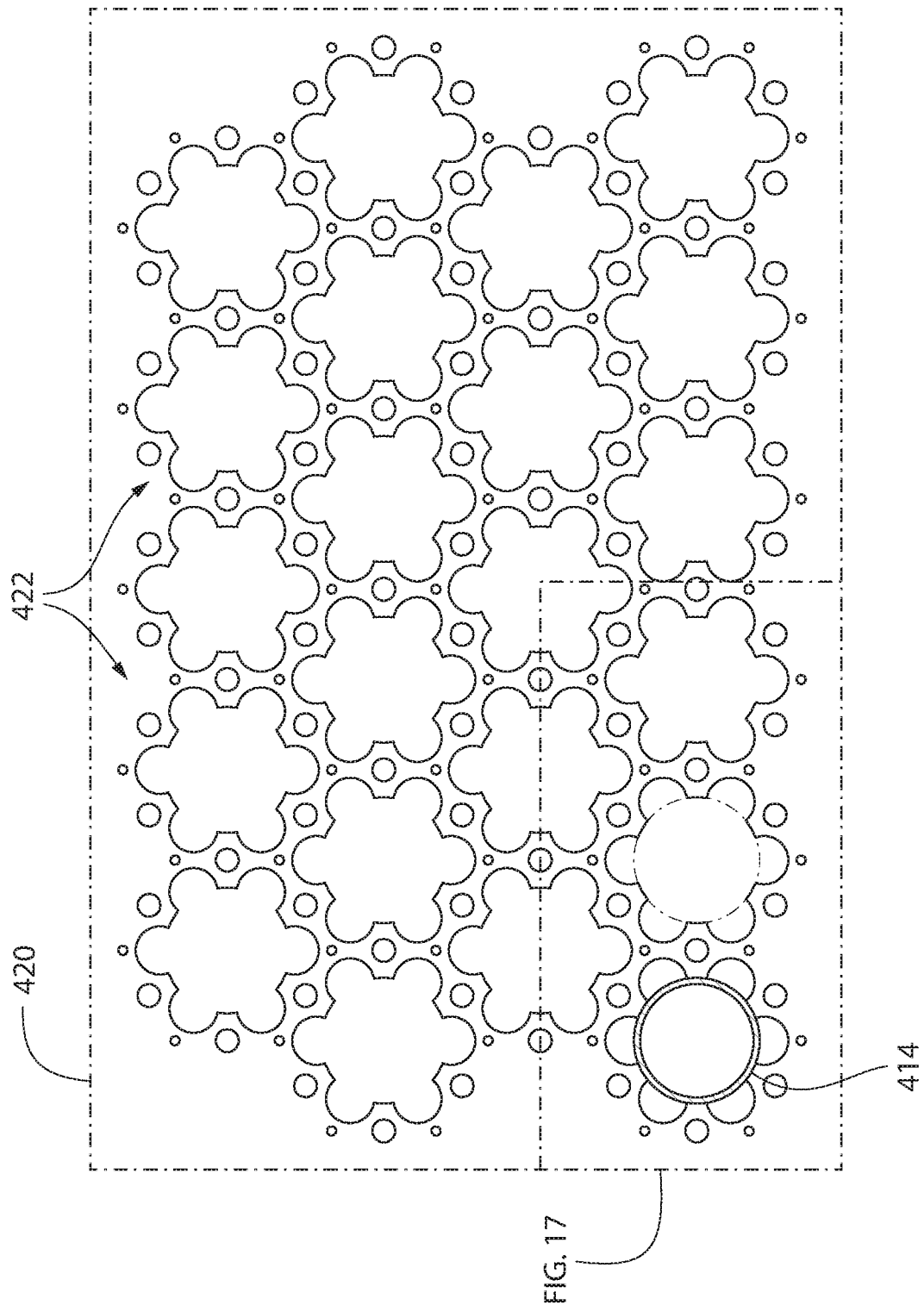
FIG. 16 is an enlarged partial section thereof.
Figure 17:
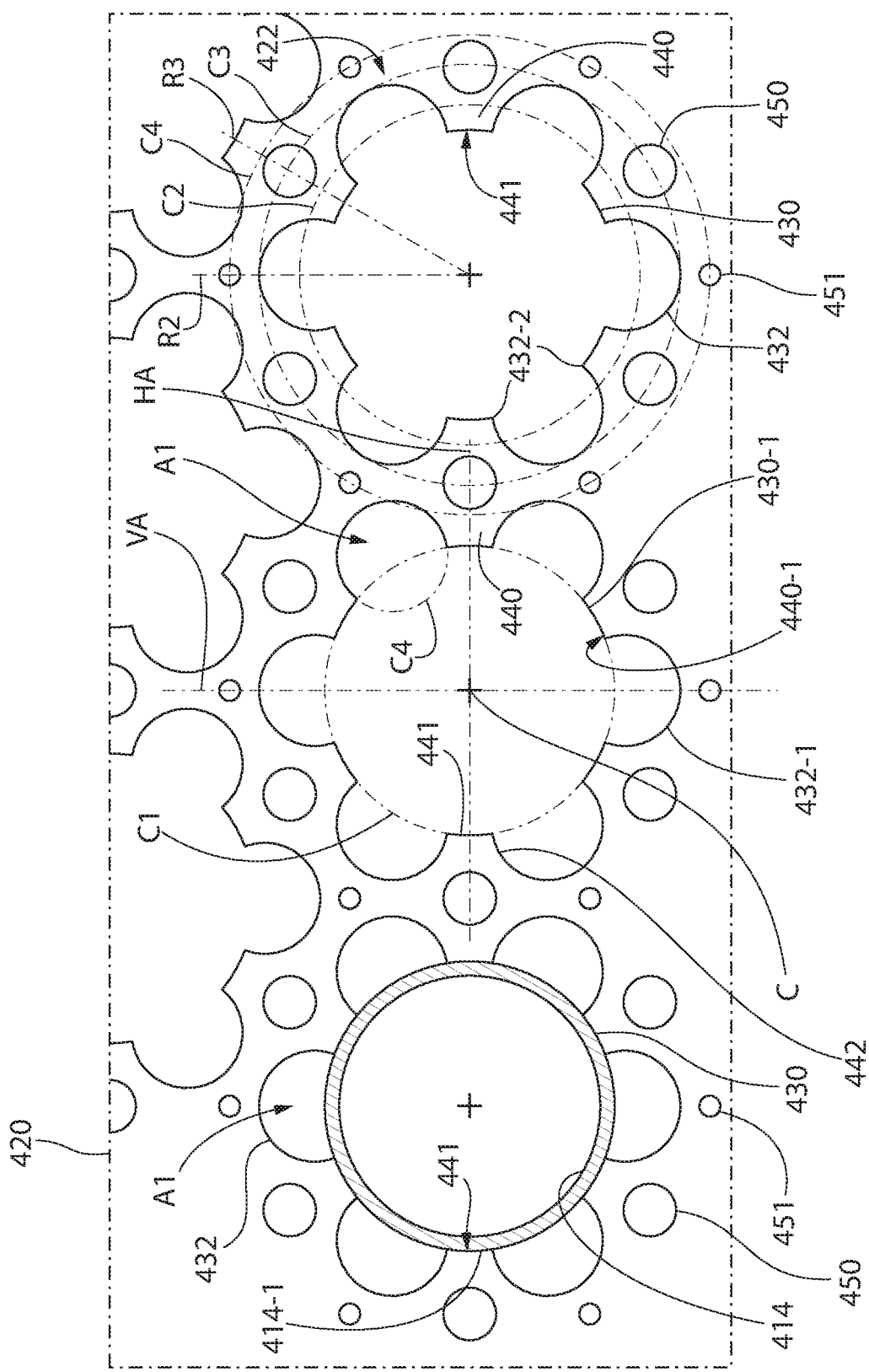
FIG. 17 is a further enlarged partial section thereof taken from FIG. 16.

Referring to FIGS. 15-17, each tube aperture 422 comprises a central tube hole 430 and an associated plurality of intimately adjoining peripheral primary flow holes 432 in communication with the tube hole. Tube holes 430 each are configured and dimensioned to receive and support a single tube 414. The center of tube hole 430 coincides with common centerpoint C.

Flow holes 432 are arrayed around the circumference and perimeter of each tube hole 430 in a circumferentially spaced apart arrangement along a circle or ring. The flow holes 432 each interrupt and penetrate the circular peripheral edge 430-1 of tube holes 430 defined by the axial flow baffle plate 420 as shown. The primary flow holes 432 admit and allow shell-side fluid SSF to pass longitudinally/axially through the baffle plates along the tubes 414 at select circumferential locations adjoining the tube when located in the tube hole 430. The exterior surfaces of the tubes 414 are thus exposed in primary flow holes 432 and contacted by the shell-side fluid SSF flowing through the primary flow holes.

In one embodiment, primary flow holes 432 may be uniformly spaced around the perimeter of tube hole 430 in a circular array or pattern. An even number of primary flow holes 432 may be provided in which pairs of diametrically opposed flow holes are formed (see, e.g. FIG. 17). In one embodiment, three pairs of flow holes 432 may be provided. In other embodiments, more of less flow holes 432 and/or odd numbers of flow holes may be provided.

Primary flow holes 432 preferably have a non-polygonal semi-circular shape which is concavely and arcuately curved in a non-limiting preferred embodiment. Described another way, the primary flow holes may be considered to each have a partial circular configuration forming a portion of, but not a complete circle. Described yet another way, each primary flow hole 432 may be considered to form a crescent-shaped flow hole and corresponding flow area A1 for passage of the shell-side fluid SSF through the baffles 420.

The entire circular peripheral edge 432-1 of each primary flow hole 432 defined by the baffle plate is continuously arcuately curved from terminal end to end 432-2 where the primary flow hole 432 intersects the circular peripheral edge 430-1 of the tube hole 430 at two different circumferential locations (see, e.g. FIG. 17). There are no linear or straight portions of the flow holes 432 or its peripheral edge 432-1 as can be seen. Accordingly, the peripheral edge 432-1 of each primary flow hole has a first end at the peripheral edge 430-1 of the tube hole 430, and a second end at another at peripheral edge 430-1; the first and second ends of each primary flow hole being at circumferentially spaced apart points on the peripheral edge 430-1 of the tube hole 430. Advantageously, the continuously curved profile of the flow hole peripheral edge 432-1 eliminates any angled corners between its ends which might induce the formation of shell-side flow eddies and dead zones. The intersection of the circular flow hole peripheral edge 432-1 with the circular tube hole peripheral edge 430-1 forms angled corners 440-1 therebetween coinciding with the terminal ends 432-2 of each primary flow hole 432. However, these corners 440-1 lie adjacent to the tube 414 and are not between the ends 432-2 of the flow holes 432 as shown, thereby preserving the continuously arcuate shape of the flow holes 432.

In one embodiment, the geometric center of each flow hole 432 may lie on or adjacent to an imaginary reference circle C1 defined by the circumference of the tube hole 430. Reference circle C1 of tube hole 430 intersects the imaginary reference circles C4 defined by each primary flow hole 432 at two circumferentially spaced apart points (see, e.g. FIG. 17). The two points of intersection define the terminal ends of each primary flow hole 432. When the tube 414 is positioned in the tube hole as shown in FIG. 17, left image, a flow area A1 of each primary flow hole 432 is defined. Flow area A1 may be considered crescent shaped in one embodiment as illustrated due the primary flow holes 432 overlapping and intersecting the tube hole 430.

Figure 18A:
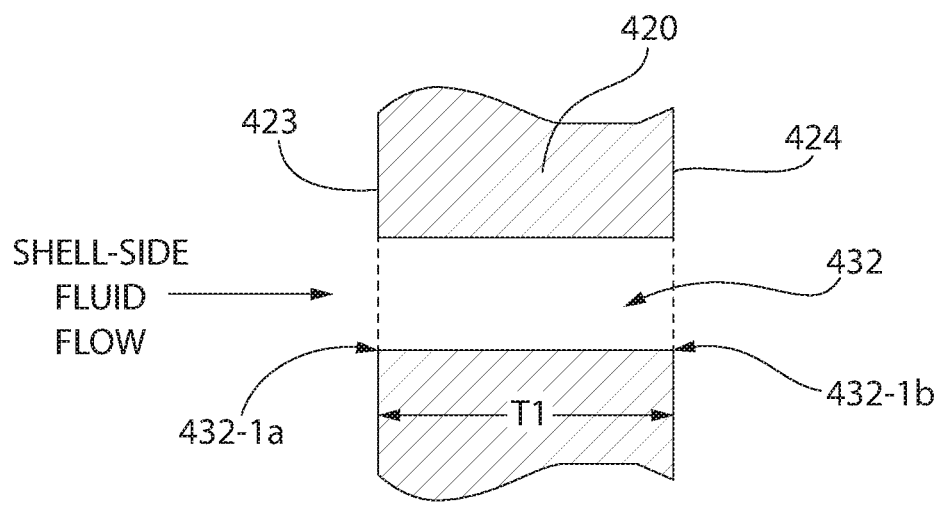
FIG. 18A is transverse cross-sectional view of one of the primary flow holes of the tube apertures of FIG. 17.
Figure 18B:
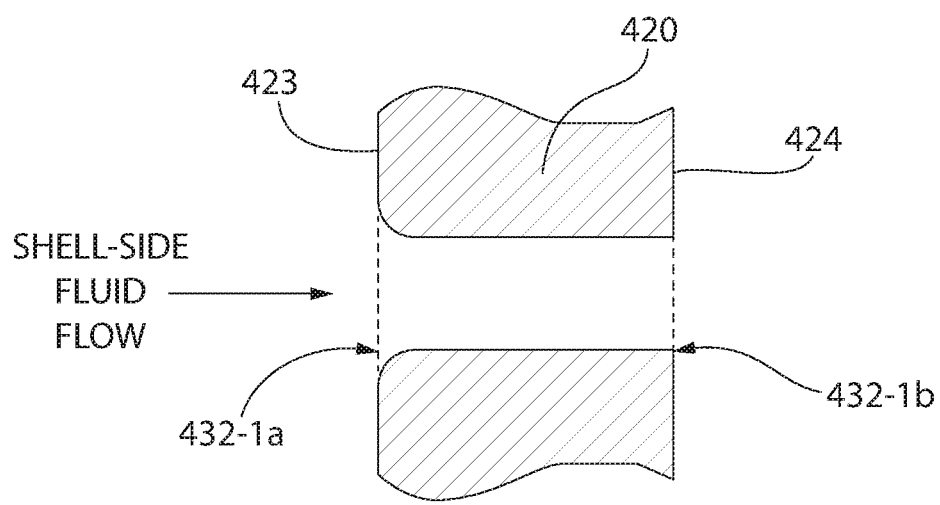
FIG. 18B is a second transverse cross-sectional view of a primary flow hole including a rounded entrance portion.

The leading peripheral edge 432-1a of the primary flow holes 432 may be sharp edged forming a 90 degree angle as shown in FIG. 18A, or preferably may be chamfered or radiused (i.e. rounded) as shown in FIG. 18B to decrease the pressure loss due to sudden contraction of the shell-side fluid through the hole. Experimental results have shown that the rounded leading edge reduces the overall pressure drop by about 27% for just hand filing the edges. The trailing peripheral edge 432-1b of the primary flow holes 432 may be sharp edged or rounded with no significant detriment to pressure drop.

In one embodiment, every primary flow hole 432 of each axial flow baffle 420 may be longitudinally and concentrically aligned with corresponding primary flow holes 432 in every other baffle. Such an arrangement creates a substantially linear shell-side fluid SSF flow path through the shell-side space 408 of the shell 403 of the heat exchanger 400 between sets of matched primary flow holes 432 in each baffle. Accordingly, in one embodiment each baffle 420, and the arrangement and orientation of each of the tube apertures 422 in each baffle, may be identical to achieve the described longitudinal alignment of primary flow holes 432.

Referring to FIGS. 15-17, the peripheral edge 430-1 of tube hole 430 has a castellated configuration in one embodiment. The ligaments of the baffle 420 plate between the primary flow holes 432 of each tube aperture 422 define radially inward projecting tube support protrusions 440 circumferentially spaced apart about the central flow hole 430 at intervals. Protrusions 440 may be formed integrally with the axial flow baffle plate as a monolithic unitary structural part thereof in one embodiment as shown.

Support protrusions 440 each define arcuately curved bearing surfaces 441 which conformably engage and contact the exterior of the tubes 414 when located in the circular tube holes 430. It bears noting that the arcuate bearing surfaces 441 actually are formed by remaining portions of the peripheral edge 430-1 of the tube hole 430 which remain after forming the semi-circular primary flow holes 432. In one embodiment, each and every support protrusion 440 preferably engages the exterior surface 414-1 of the tube 414. When the axial flow baffles 420 are subjected to the hot shell-side fluid SSF (typically hotter than the tube-side fluid TSF which is heated by the shell-side fluid), the metal baffle plates will expand to ensure conformal engagement between the tubes and the arcuate support protrusion bearing surfaces 441.

As best shown in FIG. 17, each tube support protrusion 440 includes a pair of opposing sidewalls 442 adjoining the arcuate bearing surface 441. In one embodiment, the sidewalls 442 are arcuately and concavely curved in shape.

Because the primary flow holes 432 holes reduce the surface contact area between the baffle 420 plate and the tube 414 at the tube hole 430, it is necessary to ensure that preferably at least ⅓rd of the circumference and peripheral edge 430-1 of the baffle plate at the tube hole remains available for providing lateral support to the tube to protect against flow induced vibration related wear to the tube. Accordingly, the radial tube support protrusions 440 preferably have a collective bearing surface 441 area which is at least ⅓rd of the circumference of the tube hole 430. In addition, the radial tube support protrusions 440 are preferably evenly spaced apart around the circumference of the tube hole 430 (see, e.g. FIG. 17). This provides uniform support of the tube 414 all around it exterior surface 414-1. In one embodiment, the upper half of the tube 414 above the aperture horizontal axis HA of each tube aperture 422 is supported by at least two tube support protrusions 440 and the lower half of the tube below horizontal axis HA is supported by at least two protrusions 440 as shown. In one embodiment, the right half of tube 414 to the right of the aperture vertical axis VA of each tube aperture 422 is supported by at least three tube support protrusions 440 and the left half of the tube to the right of vertical axis VA is supported by at least three protrusions 440 as shown Adjusting the radial position of the primary flow holes 432 inwards or outwards relative to the tube hole 430 to alter the flow area A1 of the flow holes concomitantly decreases or increases the circumferential width of the arcuate bearing surfaces of the tube support protrusions 440.

In comparison to mechanically broached polygonal flow holes which provide axial flow, the present arcuately rounded non-polygonal flow holes 432 provides advantages. First, the axial flow baffle provides greater and more uniform surface contact with and support of the tubes (e.g. lateral support) via the tube support protrusions 440 compared to broached tube support plates which typically provide line contact or reduced surface contact depending on their design. The increased surface of contact with the tubes provides greater margin of safety to avoid flow induced vibration damage to the tubes at the baffle locations particularly under flow rates higher than design conditions or due to transient operation of the heat exchanger. Heat exchangers that are expected to have transient flow conditions exceeding design conditions greatly benefit from the present axial flow baffles 420 ability to provide greater margin of safety to flow induced vibration related tube damage. In addition, the non-polygonal crescent or semi-circular shaped primary flow holes 432 eliminate angles within the primary flow holes which reduces formation of flow eddies at the openings which may increase pressure drop of the shell-side fluid across the baffles.

In some embodiments, additional optional secondary flow holes 450 and also tertiary flow holes 451 may be formed in the solid ligaments of the baffle plate material remaining between the tube apertures 422 as shown in FIGS. 16 and 17. These additional flow holes do not overlap the tube holes 430 of each tube aperture 422, and provide additional flow area for heat exchanger internal shell-side fluid SSF to pass through the baffles to alleviate shell-side fluid pressure loss. The secondary and tertiary flow holes 450, 451 are otherwise inconsequential to the heat exchanger's performance and heat transfer rate. In some embodiments, only secondary flow holes 450 may be used without need for tertiary flow holes 451 depending on the reduction is shell-side pressure loss necessary across each baffle. In some embodiments, only some of the baffles may have secondary or secondary and tertiary flow holes. In addition, not every flow aperture 422 in a single baffle 420 has secondary or secondary and tertiary flow holes if used. According, at least some of the tube apertures 422 in some embodiments may optionally include secondary or secondary and tertiary flow holes to minimize the shell-side fluid pressure drop across each axial flow baffle 420 if required.

In one embodiment, the secondary flow holes 450 may be arranged in a circular array or pattern around each tube hole 430 and spaced radially apart from the tube hole. Similarly, the tertiary flow holes 451 may be arranged in a circular array or pattern around each tube hole 430 and spaced radially apart from the tube hole, and further may be spaced radially apart from the secondary flow holes 450. The primary, secondary, and tertiary flow holes 432, 450, and 451 are concentrically aligned with the tube hole 430 defining respective reference rings or circles C2, C3, and C4 (see, e.g. FIG. 17). Reference circles C2, C3, and C4 are thus concentrically aligned with reference circle C1 defined by the tube hole 430.

In some embodiments, the tertiary flow holes 451 and primary flow holes 432 may lie on the same radius line R2 originating at the centerpoint C of the tube hole 430 and are axially aligned (with respect to the centers of the holes). The secondary flow holes 450 may lie on a different radius line R3, which is interspersed between the radius lines R2 and the primary and tertiary flow holes 432, 451 (see, e.g. FIG. 17). This arranged of flow holes advantageously preserves as much ligament of baffle plate material between the various holes to maintain strength and rigidity of the baffles 420. The secondary flow holes 450 may be formed at least partially in the ligaments of the baffle 420 and between the primary flow holes 432 that defines the tube support protrusions 440. The reference circle C3 of the secondary flow holes 450 may intersect the outermost peripheral edge 432-1 distal-most from centerpoint C of each flow aperture 422 in some embodiments as shown in FIG. 17.

A process or method for fabricating an axial flow baffle 420 will now be briefly described. The following method or process may advantageously be performed using only a single type of machine tool comprising a drill press or vertical milling machine to drill a variety of circular holes of different diameters in the workpiece for forming the necessary tube support and flow holes.

Figure 29:
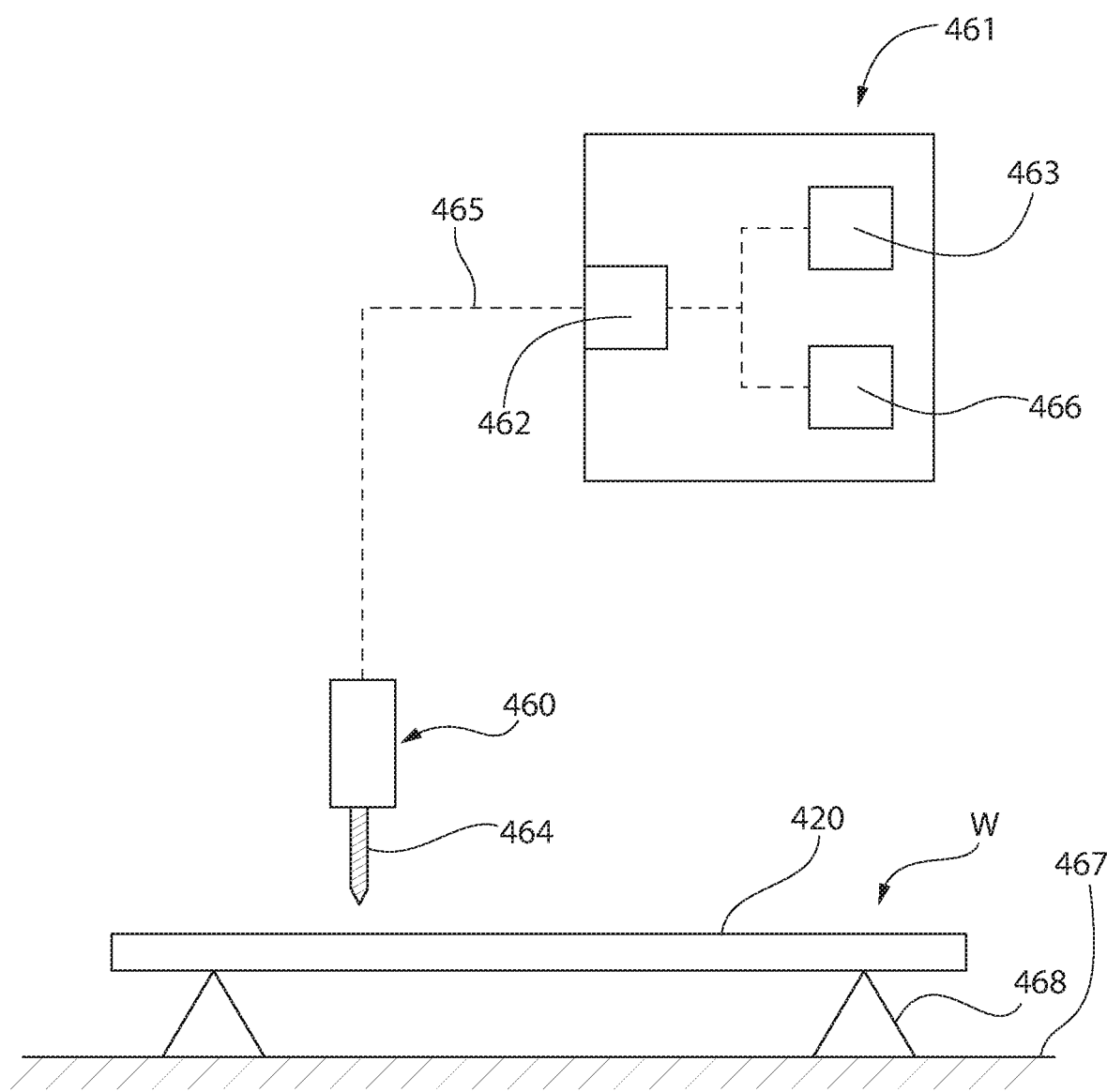
FIG. 29 is a schematic diagram of a heat exchanger baffle fabrication system according to the present disclosure.

Referring to the schematic system diagram of FIG. 29. the following axial flow baffle 420 fabrication process preferably is performed using a CNC (computer numeric control)

machine tool 460 with drilling bit 464 (e.g. drill press or milling machine) under the control and direction of a control system including computer 461 with programmable central processor 462, non-transient tangible computer-readable medium 463, various input/output peripherals and interfaces 466 (e.g. communication modules or input/output connectors, etc.), and all other conventional appurtenances and ancillary devices and components (e.g. power supply, etc.) necessary to form a fully function process controller. The processor 462 is programmed with and operable to execute program instructions or code (e.g. control logic or software) configured to direct operation of the machine tool 460 to perform the steps and processes described below via wireless and/or wired communication pathways 465. Computer readable medium 463 may include volatile memory and non-volatile memory operably and communicably coupled to the processor(s). Any suitable combination and types of volatile or non-volatile memory may be used including as examples, without limitation, random access memory (RAM) and various types thereof, read-only memory (ROM) and various types thereof, flash memory, or other memory which may be written to and/or read by the processor operably connected to the medium. Both the volatile memory and the non-volatile memory may be used for storing the program instructions or software.

It is well within the ambit of one skilled in the art to provide and configure the control system with all the required appurtenances to provide a fully function control system for operating the machine tool 460 in the manner disclosed herein. It will be appreciated that various aspects of control system and functionality may be embodied in software, firmware, or hardware.

General reference is now be made to FIG. 17 which provides an enlarged view of a section of the axial flow baffle 420 and tube apertures 422, secondary flow holes 450, and tertiary flow holes 451 along with reference circles used to direct operation of the machine tool 460 via the processor 462. Reference is also made to forgoing system diagram FIG. 29.

The method comprises first providing and supporting a substantially flat metallic baffle 420 plate workpiece W from a support surface 467 via suitable supports 468. Although FIG. 29 depicts horizontal orientation of the workpiece, in other embodiments it may be vertical. The baffle plate may be horizontal oriented in one embodiment; however, in other embodiments the baffle workpiece may be vertically oriented. In one embodiment, the baffle plate workpiece may be circular in shape with circumferentially extending perimeter. The baffle plate may be made of any suitable metal for the service conditions of the heat exchanger. Some non-limiting examples include carbon steel, stainless steel, Nitronic® 60, and others. Any suitable thickness of the baffle plate may be provided for the service conditions. Some typical non-limiting ranges used include generally about ⅛ to ¾ inches for heat exchangers, and generally about 1-1 to 1½ inches for larger diameter (e.g. 10 feet or more) for steam generators such as those that may be used in nuclear power generation facilities. The invention is not limited to foregoing examples of thicknesses and material types.

The method continues with the processor 462 next locating the centerpoint C of a first tube aperture 422. Next, the circular primary flow holes 432 are first drilled with machine tool 460 (e.g. drill press or milling machine) under the direction of processor 462 preferably before forming the tube hole 430. Otherwise, if the order is reversed, the drill or milling bit would tend to migrate inwards in the workpiece towards an already drilled void of the central larger diameter tube hole 430, thereby rendering control of the bit and formation of an accurate circular cut difficult for each primary flow hole 432. The primary flow holes 432 are drilled in a circumferentially spaced pattern along reference circle C3.

After drilling the primary flow holes 432 of each tube aperture 422, the central tube hole 430 is then drilled using the same machine tool with a larger diameter drill bit. The tube hole 430 is drilled so that its center is at the geometric centerpoint C of tube aperture 422 corresponding also to the center of the circular array of primary flow holes 432 already formed. The tube hole 430 has a diameter selected and cut to partially overlap and intersect each of the primary flow holes. The workpiece material removed by formation of the center tube hole 430 creates and leaves the non-polygonal, semi-circular shaped primary flow holes 432 which represent the finished crescent-shaped geometry of the primary flow holes. Primary flow holes 432 are concentrically arranged to the tube hole 430 as shown. The tube hole 430 and primary flow holes 432 are now completed. The process and steps may be repeated for each of the tube aperture locations by the CNC machine tool.

It bears noting that in some fabrication sequences, the primary flow holes and center tube hole need not be completed for one tube aperture 422 before proceeding to the next tube aperture. Accordingly, in some fabrication sequences the centerpoints C of all of the primary flow holes 432 may be located and drilled first in the baffle workpiece W by the CNC machine tool 460, followed next by then drilling all of the tube holes 430 for each tube aperture 422 in the manner described above.

In one embodiment, the secondary and tertiary flow holes 450, 451 may next be cut (i.e. drilled) and completed in any order after drilling the primary flow holes 432 and center tube holes 430 of each tube aperture 422. Alternatively, in another embodiment, the secondary and tertiary flow holes may be formed before drilling the center tube holes 430 either after drilling the primary flow holes 432 or before. Because the secondary and tertiary flow holes do not overlap the primary flow holes 432 or tube holes 430, their formation is independent of forming the latter two holes.

The secondary flow holes 450 are located and drilled along reference circle C3 in circumferentially spaced apart relationship. The tertiary flow holes 451 are located and drilled along reference circle C4 in circumferentially spaced apart relationship. In one embodiment, the tertiary flow holes 451 may be smaller in diameter than the secondary flow holes 450. The secondary flow holes 450 may be smaller in diameter than the primary flow holes 432 in in the same or another embodiment. The diameters of the secondary and tertiary flow holes are selected to not reduce the remaining ligaments of the baffle 420 between various holes to the point where the structural integrity of the baffle plate is compromised. The sizing, lateral spacing, and arrangement of the primary, secondary, and tertiary flow holes previously described herein helps preserve sufficient ligament dimensions to avoid structural integrity problems. In some embodiment, the ligament between the holes can be as small as 1/16 (or lower as practicable by the machining process) depending in part on the thickness of the baffle plate and strength of the metal selected.

The centerpoints C of each tube aperture 422 and concentric arrangement of the primary flow holes 432 and second and tertiary flow holes 450, 451 if provided which are arranged circumferentially along reference circles C2, C3, C4 advantageously provides a convenient mapping system for controlling drilling of the various apertures/holes by the CNC machine tool 460.

It further bears noting that the foregoing fabrication process for forming the tube apertures 422 each with a tube hole 430 and associated array of primary flow holes 432 is advantageously mechanically simpler, quicker, and less expensive than forming broached axial flow holes in a baffle. The broaching process forms polygonal shaped auxiliary flow openings using a separate broaching chisel or bit. In general, the circular center tube hole must first be drilled using a first drill bit and rotational cutting action. Next, the first drill bit is removed and replaced with a second drill bit having a larger diameter which is used to form a recessed edge chamfer around the central tube hole. This is necessary to keep the broaching bit centered with respect to the tube hole and prevent it from wandering when used. Next, the second drill bit is removed and replaced with a special broaching bit housing which causes the broaching bit to oscillate and wobble, but not rotate creating a metal cutting chiseling action up/down normal to the major face or surface of the baffle plate. The broaching bit chisels away at the sides of the already formed tube hole gradually removing strips or shavings of metal from the tube hole to form the polygonal shaped flow openings as the broaching bit advances slowly downwards along the tube hole wall. It bears noting that the broaching bit is incapable of penetrating virgin solid metal without the aid of the central tube hole, which must necessarily be formed first in a metal broaching operation. The broaching operation also requires extreme downward pressure and force normal to the major surface of the baffle plate to chisel out the metal, which can cause the baffle plate to bow and deform around the tube holes. This can adversely affect proper alignment and seating of the heat exchanger tubes in the tube holes of the baffle, thereby leaving such dimensionally skewed openings more susceptible to flow induced tube vibration damage and fretting wear in some instances.

According to another aspect of the invention, the present axial flow baffle hole concept can be extended to the traditional cross-flow baffle designs where in lieu of the bypass windows or openings cut out of the segmental or other type baffle (e.g. disk and donut, etc.), a uniquely configured full-diameter hybrid cross-flow baffle is provided which accommodates cross-flow of the shell-side fluid over the tubes to increase heat transfer rates and efficiency. The hybrid baffle replaces the bypass windows or openings at conventional segmental or other cross-flow baffle location with select portions or regions having an array of the tube apertures 422 previously described herein. This provides the axial flow in those regions to replicate the desired bypass cross flow over the tubes. However, unlike conventional segmental or other cross-flow baffles, all tubes in the tube bundle are now advantageously fully supported at each baffle location including those previously unsupported tubes in the conventional bypass window or opening baffle arrangements. The heretofore unsupported long tube spans between baffles for the traditional cross-flow baffles with open bypass windows or openings can be reduced at least in half in comparison to traditional single segmental baffles, and even more for double and triple segmental baffles. There is a small penalty for reduced flow in the bypass cross-flow regions of the present hybrid baffle window area. This can be compensated for by the design of the heat exchanger and provision of primary, secondary, and tertiary flow holes 432, 450, 451 previously described herein as needed.

The conventional circular tube holes are retained in the remaining portions of full diameter circular hybrid baffles which do not permit axial shell-side fluid flow and divert the flow transversely to the axial flow portions or regions of each baffle to obtain the desired bypass cross-flow pattern.

FIGS. 19-24 show several non-limiting examples of hybrid baffles, as further described below.

Figure 19:
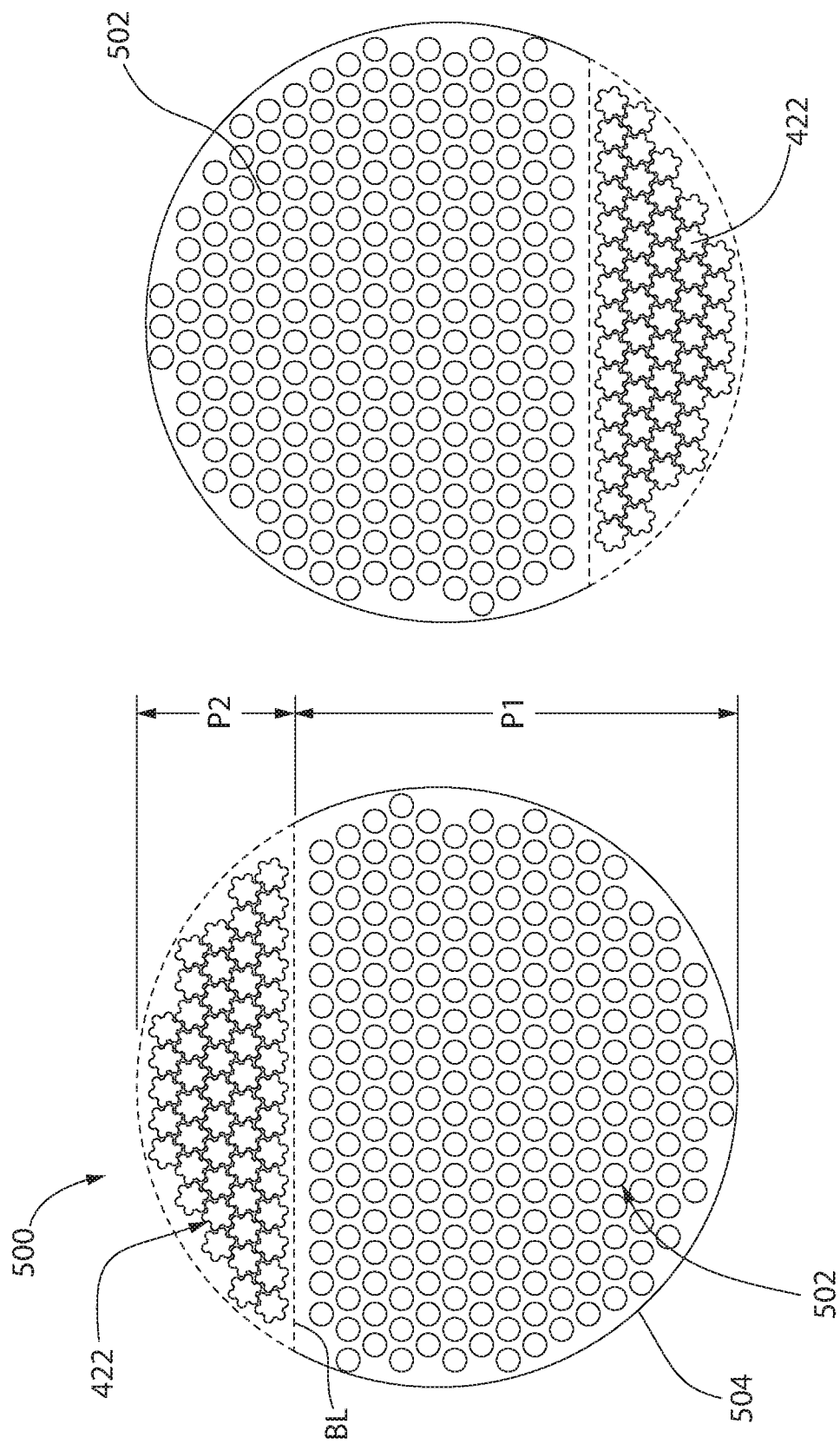
FIG. 19 shows plan views of a first embodiment of a hybrid cross-flow baffle for a shell and tube heat exchanger according to the present disclosure.
Figure 20:
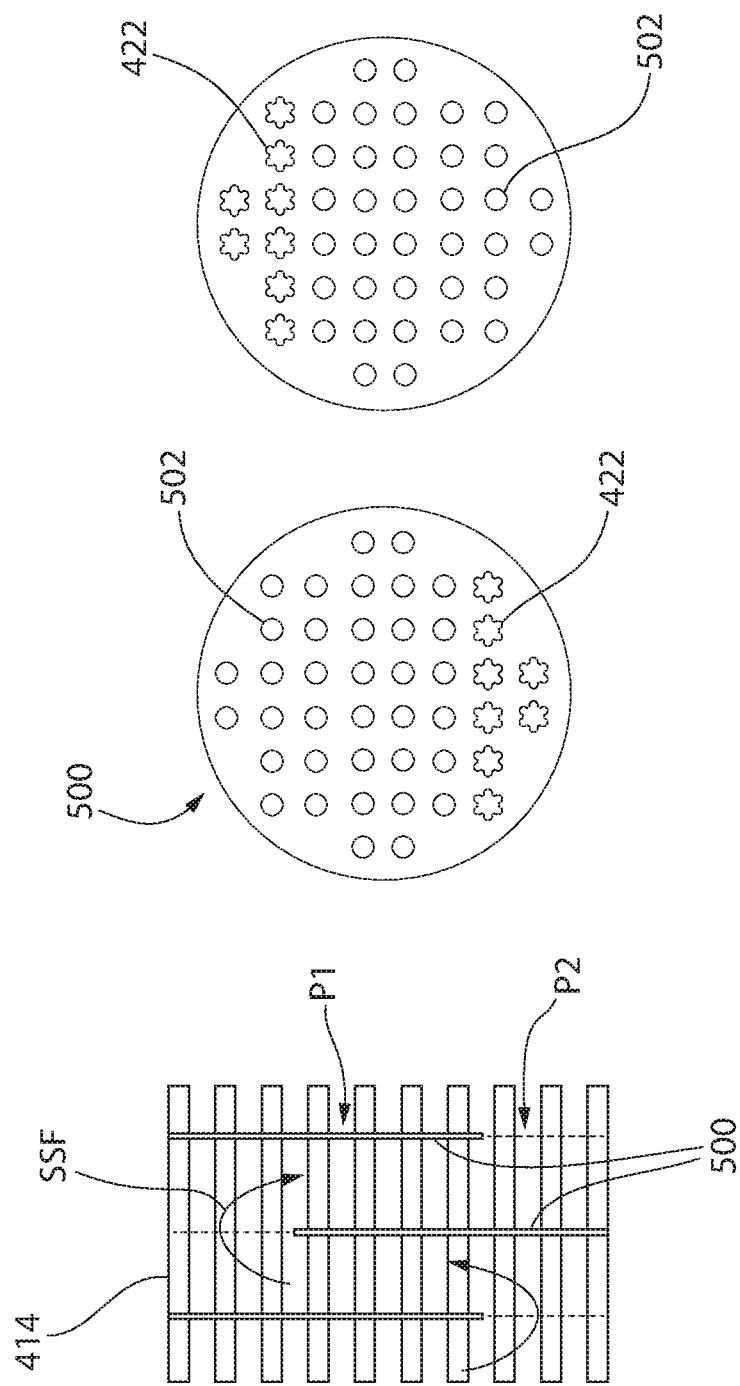
FIG. 20 shows additional plan views thereof and the resulting shell-side fluid flow pattern produced.

FIG. 19 shows an example for a single segmental type hybrid cross-flow baffle 500 according to the present disclosure. Baffle 500 has a full diameter circular shape defining a concomitant circumferentially-extending peripheral edge 504 which is positioned in close proximity to the interior surface of the heat exchanger shell in the same manner as baffle 420 previously described herein to minimize flow around the peripheral edge of the baffle. Baffle 500 includes a first portion or region P1 comprising an array of a plurality of conventional circular tube holes 502 and a second axial flow portion or region P2 comprising an array of a plurality of the tube apertures 422 previously described herein (star-shaped openings in the figure). Each tube aperture 422 includes a central tube support hole 430 and primary flow holes 432. Secondary and tertiary flow holes 450, 451 may be included as needed to achieve the desired axial bypass flow of the shell-side fluid SSF while minimizing pressure drop across the baffle. The regions P1 and P2 are separated by an imaginary linear boundary line BL (shown dashed) forming a secant of the circular baffle full diameter baffle. In this single segmental hybrid baffle, the axial flow region P2 comprises less than half of the surface area of the hybrid baffle plate. Though of another way, the axial flow region P2 comprises a minority of the surface area normal to the longitudinal flow of the shell-side fluid and the region P1 comprises a majority of the surface area as shown.

The single segmental hybrid baffles 500 shown in FIG. 19 have reverse orientations, but are the same baffle. Each of these oppositely oriented baffles are alternated along the length of and inside the heat exchanger shell to produce the traditional single segmental shell-side fluid SSF cross flow pattern 403 over tubes 414 shown schematically in FIG. 20 (see directly shell-side flow arrows). The heat exchanger 600 of FIG. 26 demonstrates the same traditional single segmental type cross-flow pattern using hybrid baffle 500.

Figure 21:
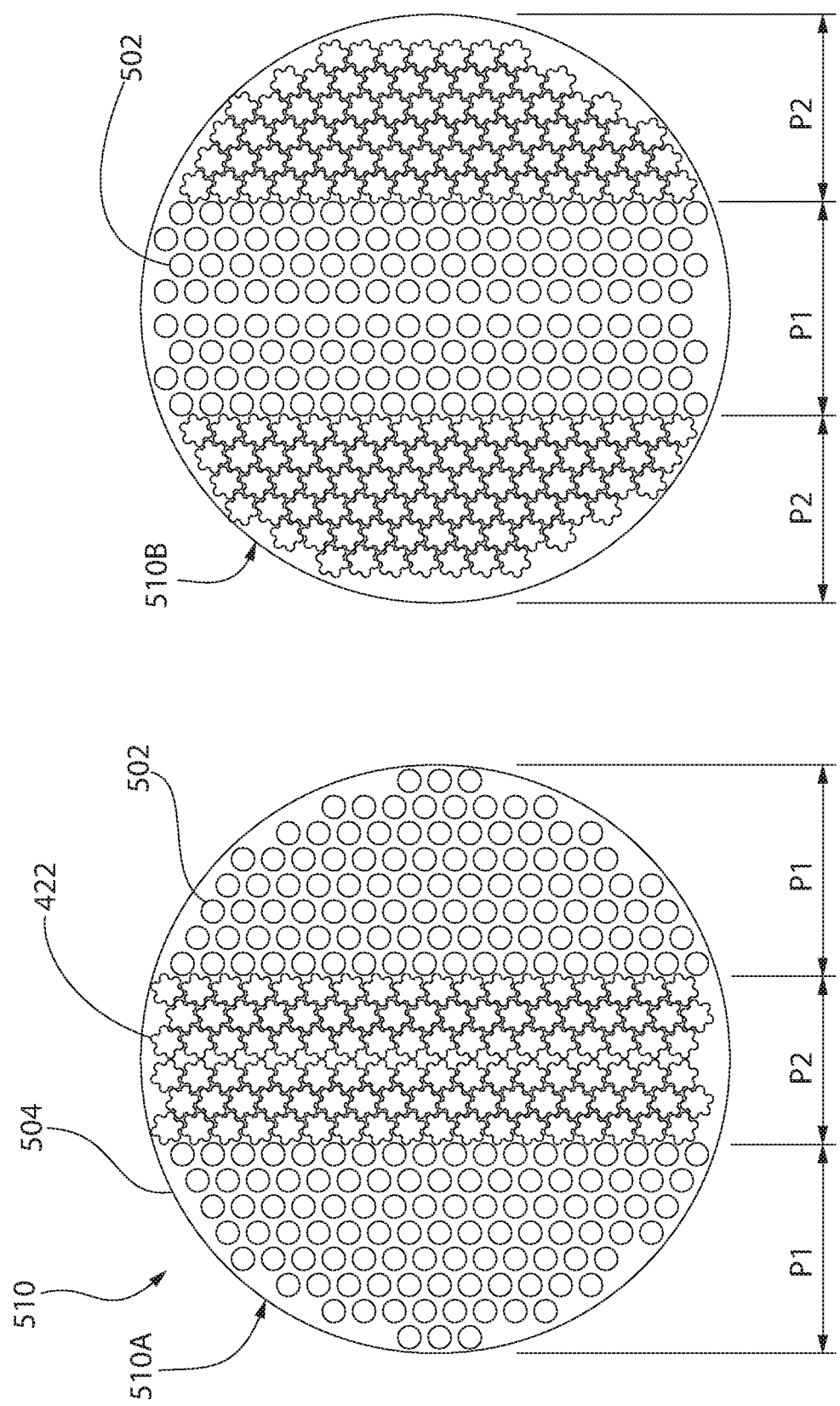
FIG. 21 shows a plan view of a second embodiment of a hybrid cross-flow baffle for a shell and tube heat exchanger according to the present disclosure.
Figure 22:
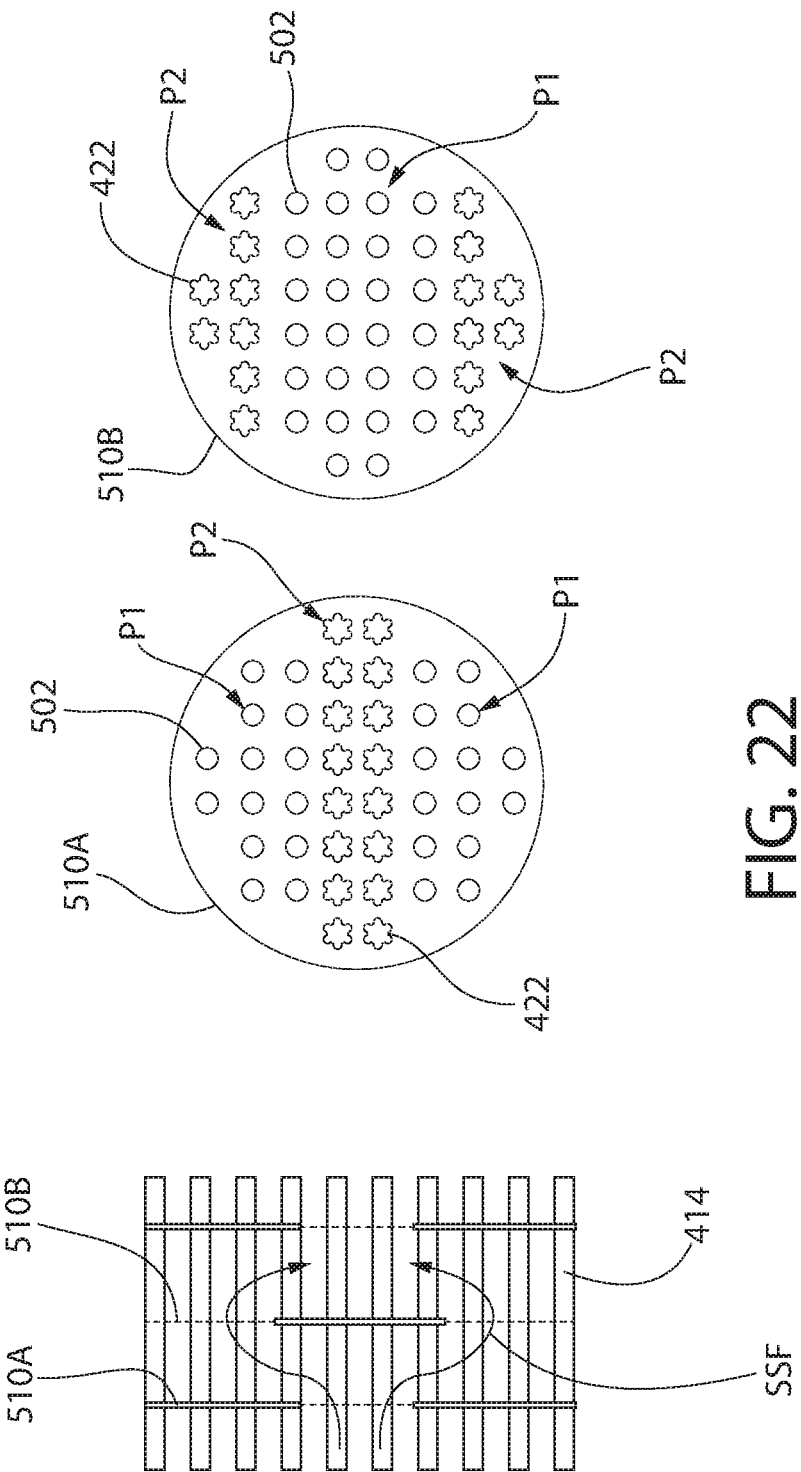
FIG. 22 shows additional plan views thereof and the resulting shell-side fluid flow pattern produced.

FIGS. 21 and 22 show an example for a double segmental type hybrid cross-flow baffle 510 according to the present disclosure. Each baffle 510 is full diameter and includes a circumferentially-extending circular peripheral edge 504. Unlike single segmental hybrid baffle 500, two different configurations of baffle 510 are provided as shown to create the traditional double segmental shell-side fluid SSF cross flow pattern shown in FIG. 22. In FIG. 21, the baffle 510A on the left has a strip-shaped central axial flow region P2 comprising flow apertures 422 and two outer semi-circular conventional tube hole regions P1 comprising circular tube holes 502 on each outer side of region P2. The baffle 510B on the right has the opposite arrangement. Each baffle 510A and 510B configuration is alternated longitudinally along the length of the heat exchanger shell.

It bears noting that in FIG. 22, the baffles 510 are shown oriented such that each of the regions P1 and P2 are horizontal oriented instead of vertically oriented as shown in FIG. 21. This is intentional to demonstrate that the baffles can have any orientation when mounted in the shell of the heat exchanger including horizontal, vertical, and any angle therebetween so long as each baffle preferably has the same relative orientation to each other to achieve the shell-side flow patterns shown for the respective type of segmental baffle (e.g. single, double, or triple). This applies to all segmental type hybrid baffles presently being described in FIGS. 19-23.

Figure 23:
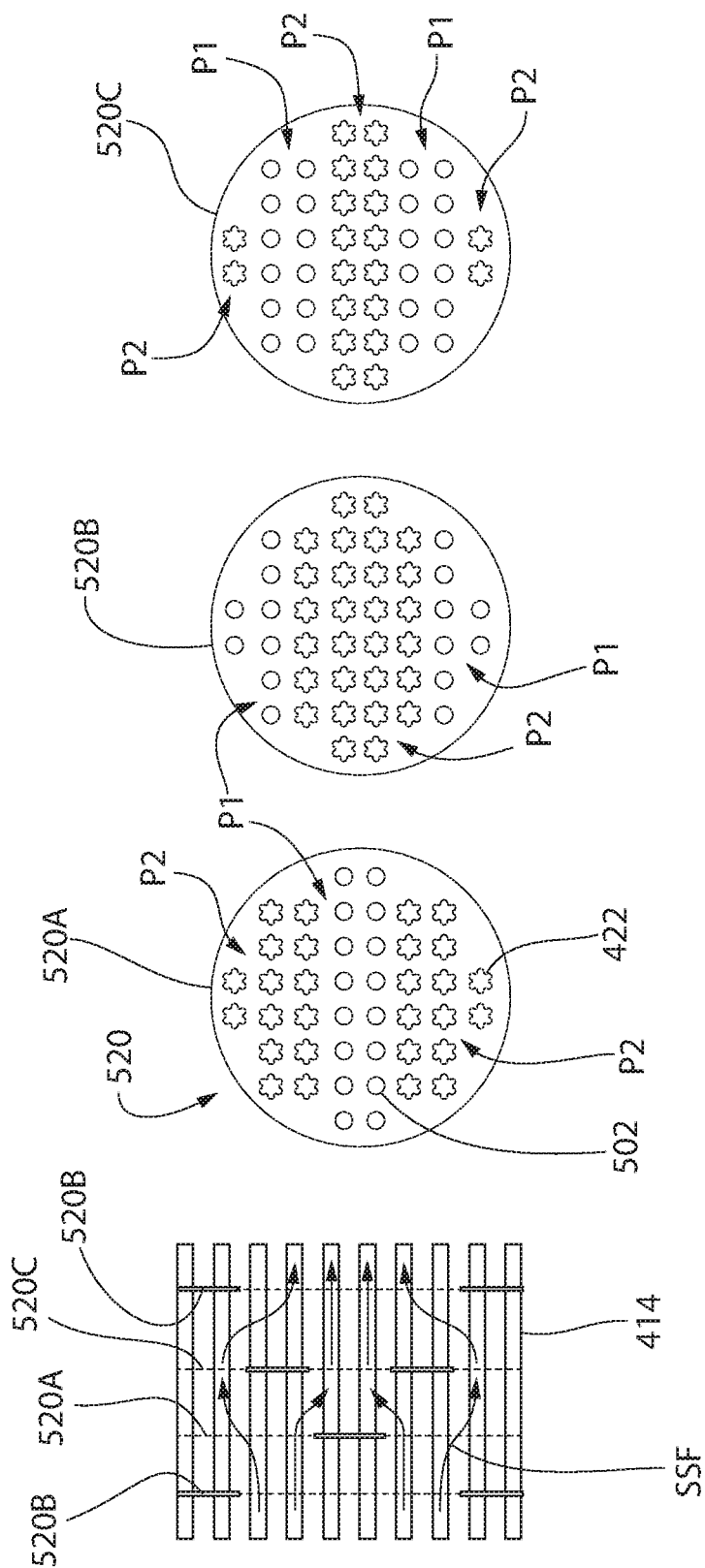
FIG. 23 shows a plan view of a third embodiment of a hybrid cross-flow baffle for a shell and tube heat exchanger according to the present disclosure and the resulting shell-side fluid flow pattern produced.

FIG. 23 shows an example for a triple segmental type hybrid cross-flow baffle 520 according to the present disclosure. Each baffle 520 is full diameter and includes a circumferentially-extending circular peripheral edge 504. The triple segmental type hybrid baffle has three different configurations of baffle 520 to create the traditional triple segmental shell-side fluid SSF cross flow pattern shown in FIG. 23. In FIG. 23, the left-most circular baffle 520A has a strip-shaped central conventional tube hole region P1 comprising circular tube holes 502 flanked by two outer semi-circular axial flow region P2 comprising flow apertures 422 on each outer side of region P1. The circular baffle 520B shown in the center has a strip-shaped central axial flow region P2 comprising flow apertures 422 and two outer semi-circular conventional tube hole regions P1 each comprising circular tube holes 502 on each outer side of region P2. The right-most circular baffle 520C has a strip-shaped central conventional tube hole region P1 comprising circular tube holes 502 flanked by two strip-shaped axial flow region P2 comprising flow apertures 422 on each side of region P1, and two outermost semi-circular shaped conventional tube hole regions P1 on each outer side of the two strip-shaped axial flow regions P2. Each of the three baffles 520A, 520B, and 520C are alternated longitudinally along the length of the heat exchanger shell to produce traditional triple segmental shell-side fluid SSF cross flow pattern as shown.

Figure 24:
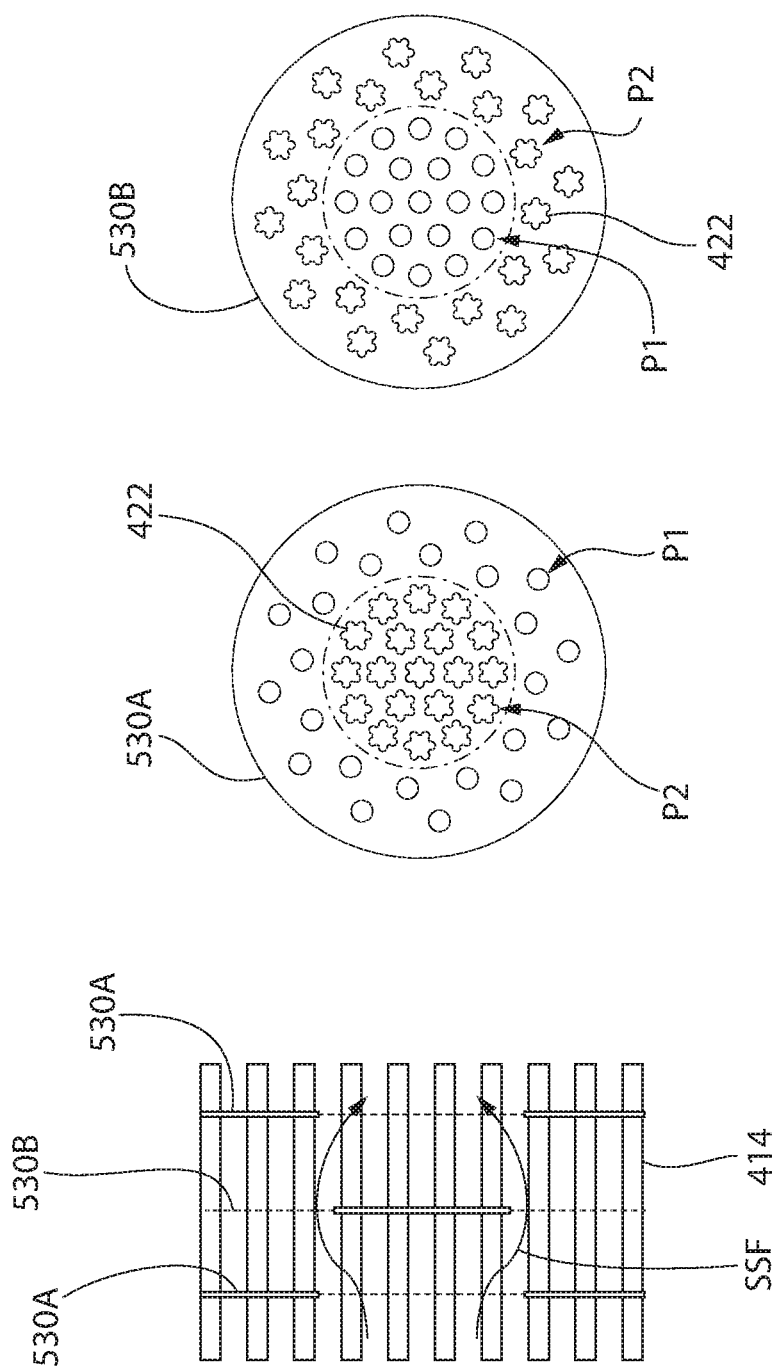
FIG. 24 shows a plan view of a fourth embodiment of a hybrid cross-flow baffle for a shell and tube heat exchanger according to the present disclosure and the resulting shell-side fluid flow pattern produced.

FIG. 24 shows a non-segmental disk and donut type hybrid baffle 530 according to the present disclosure. Each baffle 530 is full diameter and includes a circumferentially-extending circular peripheral edge 504. Two different configurations of baffles 530 are provided in this set of baffles as shown to create the traditional disk and donut shell-side fluid SSF cross flow pattern shown in FIG. 24. The baffle 530A on the left has a circular central axial flow region P2 comprising flow apertures 422 which is surrounded by a concentric annular conventional tube hole region P1 comprising circular tube holes 502. The baffle 51530B on the right has the opposite arrangement. Each baffle 530A and 530B configuration is alternated longitudinally along the length of the heat exchanger shell. The resultant shell-side fluid flow with this hybrid baffle design will be the same regarding of the orientation of the baffles.

The foregoing full-diameter cross-flow hybrid baffles provide the advantage that the entire length of tubes exposed in the shell are uniformly supported at every baffle location even those in shell-side fluid bypass areas or portions of the baffles. Compared to traditional cross-flow baffles, there are no long unsupported lengths of tubes at each baffle which are more susceptible to flow induced tube vibration resulting in fretting wear of the tubes at the baffles and premature tube failures and tube-side fluid leaks requiring such tubes to be plugged, thereby reducing the heat transfer efficiency.

Figure 26:
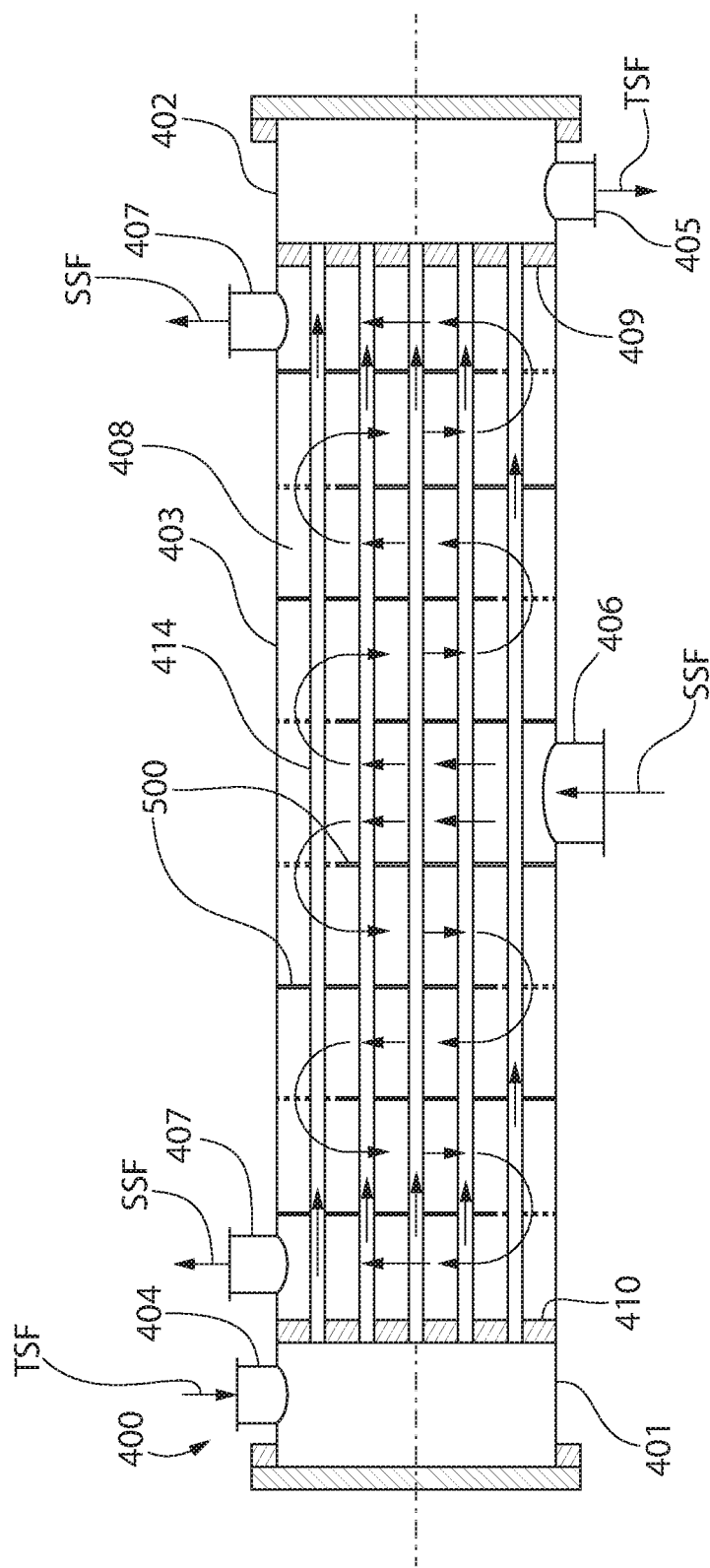
FIG. 26 shows an embodiment of a single shell-side pass shell and tube heat exchanger including the hybrid cross-flow baffles of FIG. 19.
Figure 27:
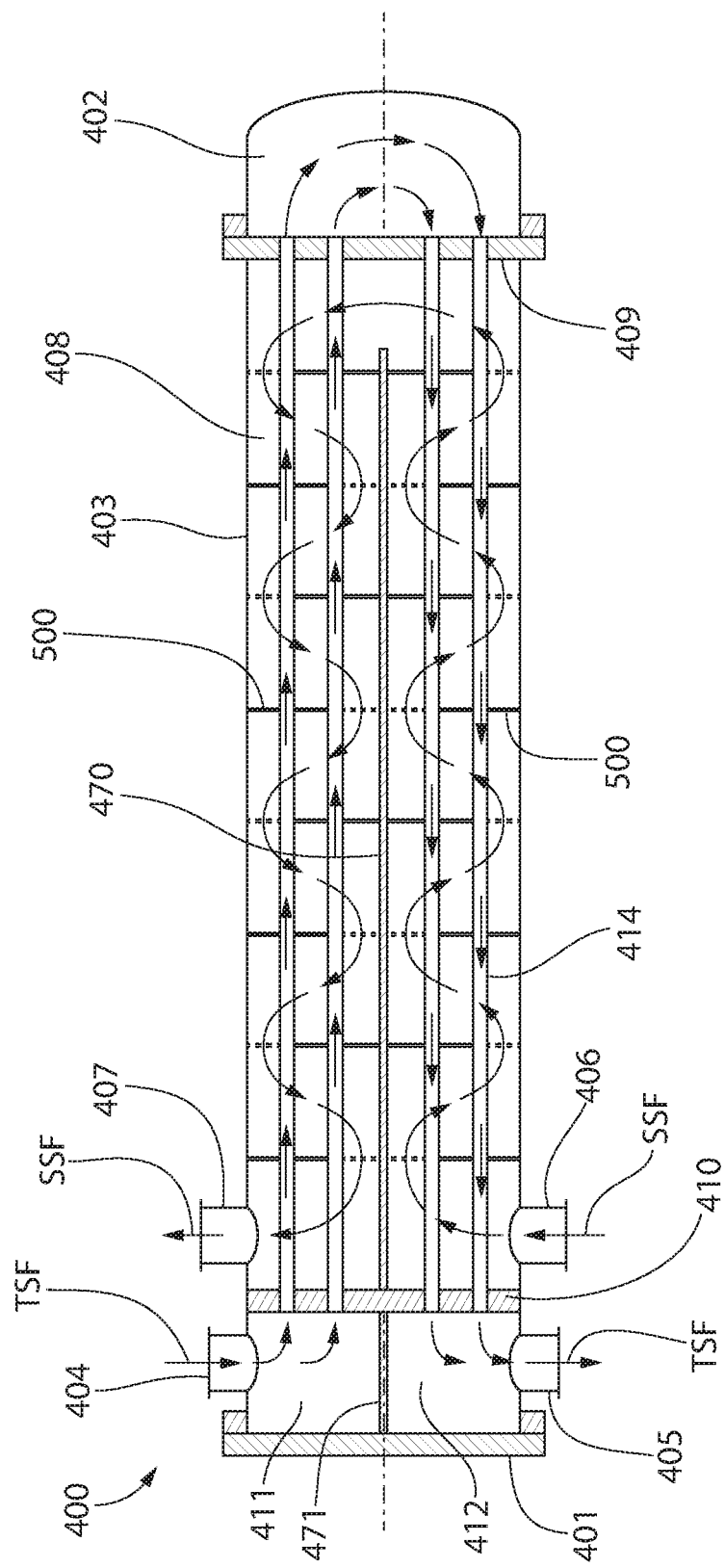
FIG. 27 shows an embodiment of a double shell-side pass shell and tube heat exchanger including the hybrid cross-flow baffles of FIG. 19.
Figure 28:
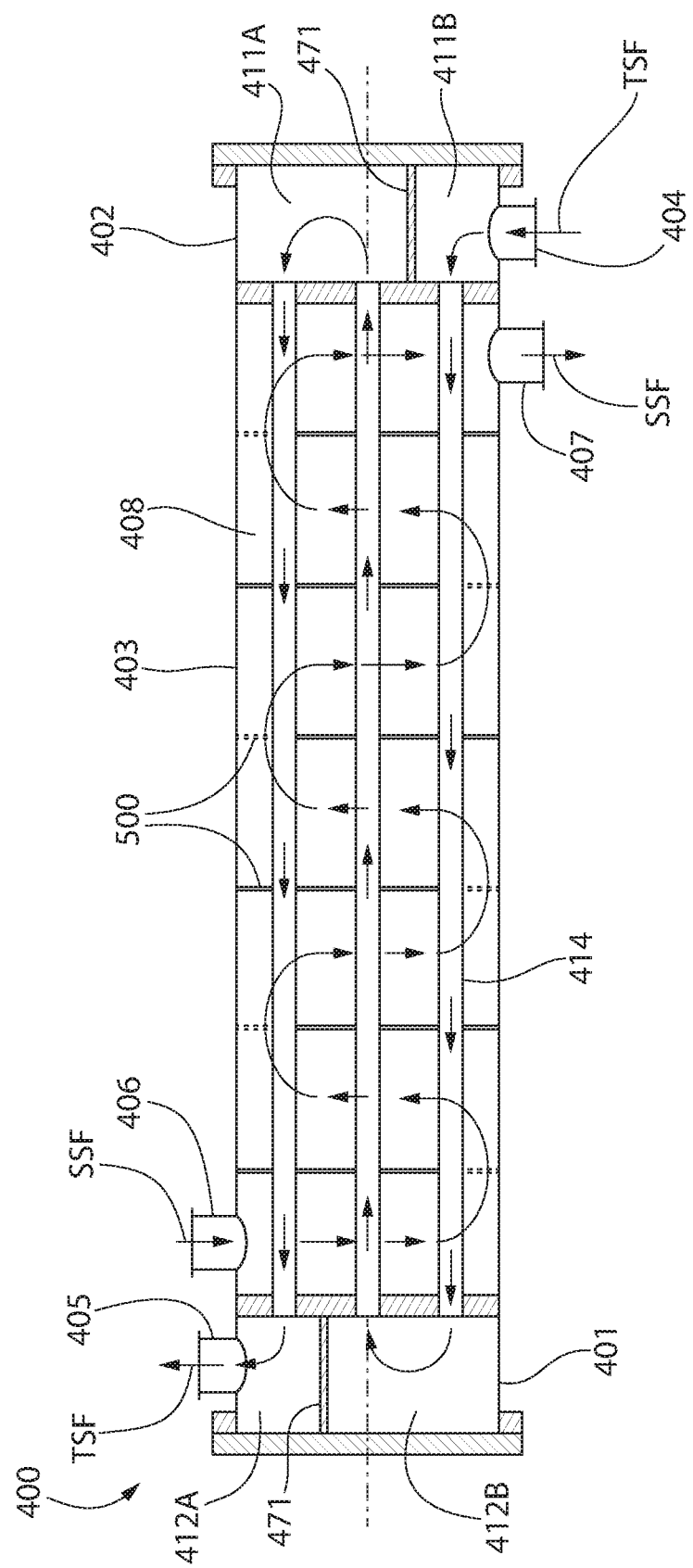
FIG. 28 shows an embodiment of a triple shell-side pass shell and tube heat exchanger including the hybrid cross-flow baffles of FIG. 19.

FIGS. 26-28 show non-limiting examples of the shell and tube heat exchanger 400 of FIG. 25 previously described herein which is slightly modified to employ single segmental type hybrid baffles 500 for creating shell-side cross-flow pattern inside shell 403 in different shell-side pass arrangements of the tube-side fluid TSF (in lieu of pure shell-side axial flow in FIG. 25). For the sake of brevity, not all components are numbered again in FIGS. 26-28 to avoid repetition with FIG. 25 but are the same components unless noted otherwise.

FIG. 26 shows a shell-side single-pass heat exchanger 400 using single segmental type hybrid baffles 500. Baffles 500 create a cross-flow pattern of the shell-side fluid SSF throughout the shell 403 of the heat exchanger as indicated by the directional shell-side flow arrows. The tube-side fluid TSF makes a single pass through the shell from end to end as indicated by the tube-side fluid TSF directional flow arrows.

FIG. 27 shows a shell-side double-pass heat exchanger 400 using single segmental type hybrid baffles 500. A longitudinal baffle 470 divides the shell-side space 408 evenly into upper and lower sections 408A and 408B which are in fluid connection only at one end of the shell near tubesheet 409 by a vertical shell-side passage opposite the shell-side fluid inlet and outlet nozzles 406, 407, as shown. Baffles 500 create a cross-flow pattern of the shell-side fluid SSF throughout the shell 403 in each of the upper and lower sections 408A, 408B of the heat exchanger as indicated by the directional shell-side flow arrows. The tube-side fluid TSF makes a double pass through the shell 403 from end to end as indicated by the tube-side fluid TSF directional flow arrows. To accomplish this double pass flow arrangement, the plenum inside head 401 is divided into an upper tube-side fluid inlet plenum 411 and lower tube-side fluid outlet plenum 412 by horizontal pass partition plate 471 which fluidly isolates the plenums inside the head as shown. The tube-side fluid inlet and outlet nozzles 404, 405 are located on head 401 and in fluid communication with their respective plenums. Partition plate 471 is sealed around its perimeter to the head to create the fluid isolation in conventional manner. Head 401 contains both the tube-side fluid inlet and outlet nozzles 404, 405. In addition, opposite head 402 is completely closed without any tube-side fluid inlet or outlet connections to reverse the direction of the tube-side fluid TSF after traversing the shell during the first pass. Head 401 may be a flanged and dish type head as shown, or any other conventional type head commonly used for shell and tube heat exchangers.

FIG. 28 shows a shell-side triple-pass heat exchanger 400 using single segmental type hybrid baffles 500. Baffles 500 create a cross-flow pattern of the shell-side fluid SSF throughout the shell 403. The tube-side fluid TSF makes a triple pass through the shell 403 from end to end as indicated by the tube-side fluid TSF directional flow arrows. To accomplish this triple pass flow arrangement, the plenum inside each head 401, 402 is divided into upper and lower plenum sections 411A and 411B, and 412A and 412B as shown by horizontal pass partition plates 471. The partition plates fluidly isolates the plenum sections inside each of the heads from each other as shown. The tube-side fluid inlet nozzle 404 may be located on head 402 and in fluid communication with lower plenum section 411B. The tube-side fluid outlet nozzle may be located on opposing head 401 and in fluid communication with upper plenum section 411B. Partition plates 471 are sealed around their perimeter to the heads to create the fluid isolation in conventional manner. It bears noting that the partition plates 471 are unevenly located inside each head such that the volume of the upper and lower plenum sections is not equal as shown for apparent reasons.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. An axial flow baffle plate for a shell and tube heat exchanger, the baffle plate comprising:
    a planar body configured for transverse arrangement in a longitudinally elongated shell of the shell and tube heat exchanger;
    a plurality of axial flow tube apertures each comprising a central tube hole configured to receive a tube of the heat exchanger, and an array of peripheral primary flow holes circumferentially spaced apart around the tube hole;
    the primary flow holes each interrupting the tube hole and forming a plurality of radially inward projecting tube support protrusions between the primary flow holes, each tube support protrusion being configured to engage the tube when located in the tube hole;
    a plurality of secondary flow holes in the baffle plate associated with at least some of the axial flow tube apertures, the secondary flow holes arranged in a circular pattern around and concentrically aligned with the tube hole and primary flow holes; and
    a plurality of tertiary flow holes formed in the baffle plate associated with the at least some of the tube apertures, the tertiary flow holes having a different diameter than the secondary flow holes;
    wherein each primary flow hole has a non-polygonal configuration.

2. The axial flow baffle plate according to claim 1, wherein each primary flow hole has a semi-circular configuration.

3. The axial flow baffle plate according to claim 1, wherein each primary flow hole is continuously arcuately curved from a first terminal end intersecting a peripheral edge of the tube hole to a second terminal end intersecting the peripheral edge of the tube hole.

4. The axial flow baffle plate according to claim 3, wherein the intersection of each primary flow hole with the peripheral edge of the tube hole forms angled corners positioned adjacent to the tube when located in the central tube hole.

5. The axial flow baffle plate according to claim 1, wherein each primary flow hole has a configuration which contains no linear portions.

6. The axial flow baffle plate according to claim 1, wherein the axial flow baffle plate is circular.

7. The axial flow baffle plate according to claim 1, wherein the primary flow holes each define an axial flow path through the axial flow baffle plate for a shell-side fluid to flow along an exterior surface of the tube exposed in each of the primary flow holes when the tube is positioned in the tube hole.

8. The axial flow baffle plate according to claim 1, wherein each primary flow hole forms a crescent shaped flow area.

9. The axial flow baffle plate according to claim 1, wherein the tertiary flow holes are arranged in a circular pattern around and concentrically aligned with the tube hole and the secondary flow holes.

10. The axial flow baffle plate according to claim 1, wherein the tube hole has an annular castellated peripheral edge which defines the radially inward projecting tube support protrusions which are configured to form conformal contact with the tube at the tube hole.

11. The heat exchanger according to claim 10, wherein the tube support protrusions are formed integrally with the baffle plate and between the primary flow holes.

12. The heat exchanger according to claim 10, wherein each tube support protrusion has an arcuate bearing surface which engages a portion of the tube when positioned in the tube hole and opposing arcuately curved sidewalls.

13. A heat exchanger with axial shell-side flow comprising:
    a longitudinally-extending shell defining a longitudinal axis and a shell-side space;
    a plurality of longitudinally-extending tubes arranged in the shell-side space;
    a plurality of transversely oriented baffles supporting the tubes in the shell;
    each baffle including a plurality of axial flow tube apertures each comprising a tube hole engaging and supporting one of the tubes, and a plurality of primary flow holes arranged circumferentially around and partially intersecting the tube hole;
    each primary flow hole configured to form a crescent-shaped flow area around the one of the tubes;
    a plurality of secondary flow holes in each baffle associated with at least some of the tube apertures, the secondary flow holes arranged in a ring around and concentrically aligned with the tube hole and primary flow holes; and
    a plurality of tertiary flow holes formed in each baffle associated with the at least some of the tube apertures, the tertiary flow holes having a different diameter than the secondary flow holes;
    wherein a shell side fluid flows through the primary flow holes in a parallel direction to the longitudinal axis.

14. The heat exchanger according to claim 13, wherein each primary flow hole has a non-polygonal semi-circular configuration.

15. The heat exchanger according to claim 13, wherein the baffle has a diameter substantially commensurate with an inside diameter of the shell.

16. The heat exchanger according to claim 13, wherein the tube hole has an annular castellated peripheral edge defining radially inward projecting tube support protrusions each in conformal contact with the tube at the tube hole.

17. The heat exchanger according to claim 16, wherein the tube support protrusions are formed integrally with the baffle plate and between the primary flow holes.

18. The heat exchanger according to claim 16, wherein each tube support protrusion has an arcuate bearing surface which engages a portion of the tube and opposing arcuately curved sidewalls.

19. The heat exchanger according to claim 13, wherein the tertiary flow holes are arranged in a ring around and concentrically aligned with the tube hole and secondary flow holes.

* * * * *